United States Patent
Nishiyama et al.

(10) Patent No.: US 7,955,665 B2
(45) Date of Patent: Jun. 7, 2011

(54) PHOTOALIGNMENT FILM COMPOSITION, OPTICALLY ANISOTROPIC MEDIUM AND METHOD FOR PREPARING THEREOF

(75) Inventors: Isa Nishiyama, Saitama (JP); Yasuhiro Kuwana, Chiba (JP); Joji Kawamura, Tokyo (JP); Kazuaki Hatsusaka, Saitama (JP)

(73) Assignee: DIC Corporation, Tokyo (JP)

( * ) Notice: Subject to any disclaimer, the term of this patent is extended or adjusted under 35 U.S.C. 154(b) by 458 days.

(21) Appl. No.: 12/093,014

(22) PCT Filed: Nov. 10, 2006

(86) PCT No.: PCT/JP2006/322455
§ 371 (c)(1), (2), (4) Date: May 8, 2008

(87) PCT Pub. No.: WO2007/055316
PCT Pub. Date: May 18, 2007

(65) Prior Publication Data
US 2009/0269513 A1    Oct. 29, 2009

(30) Foreign Application Priority Data

Nov. 10, 2005    (JP) .................................. 2005-326007

(51) Int. Cl.
*G02F 1/1337* (2006.01)
(52) U.S. Cl. .... 428/1.2; 428/1.33; 349/127; 252/299.68
(58) Field of Classification Search ............ 428/1.2, 428/1.3, 1.31, 1.33; 349/117, 123–124, 127, 349/135; 427/487; 252/299.01, 299.62, 252/299.68
See application file for complete search history.

(56) References Cited

U.S. PATENT DOCUMENTS

| | | | |
|---|---|---|---|
| 5,736,067 A | 4/1998 | Kawata et al. | |
| 5,838,407 A | 11/1998 | Chigrinov et al. | |
| 5,863,457 A | 1/1999 | Hasebe et al. | |
| 6,582,626 B2 | 6/2003 | Hasebe et al. | |
| 7,425,394 B2 * | 9/2008 | Sawatari et al. | 430/20 |
| 2002/0098295 A1 | 7/2002 | Yip et al. | |
| 2002/0145691 A1 * | 10/2002 | Ito | 349/117 |
| 2002/0180916 A1 * | 12/2002 | Schadt et al. | 349/117 |

FOREIGN PATENT DOCUMENTS

| | | |
|---|---|---|
| JP | 5-232473 A | 9/1993 |
| JP | 7-146409 A | 6/1995 |
| JP | 7-294735 A | 11/1995 |
| JP | 08-003111 A | 1/1996 |
| JP | 08-029618 A | 2/1996 |
| JP | 11-080090 A | 3/1999 |
| JP | 11-148079 A | 6/1999 |
| JP | 3016606 B2 | 12/1999 |
| JP | 2000-178233 A | 6/2000 |
| JP | 2002-145830 A | 5/2002 |
| JP | 2002-250924 A | 9/2002 |
| JP | 2002-308831 A | 10/2002 |
| JP | 2004-002373 A | 1/2004 |
| JP | 2004-099446 A | 4/2004 |
| JP | 2004-149522 A | 5/2004 |
| JP | 2005-49386 A | 2/2005 |
| JP | 2005-173547 A | 6/2005 |
| JP | 2005-173548 A | 6/2005 |
| JP | 2005-173586 A | 6/2005 |

OTHER PUBLICATIONS

International Search Report of PCT/JP2006/322455; date of mailing Jan. 23, 2007.

* cited by examiner

*Primary Examiner* — Sophie Hon
(74) *Attorney, Agent, or Firm* — Westerman, Hattori, Daniels & Adrian, LLP

(57) ABSTRACT

The present invention provides a photoalignment film composition containing a compound represented by general formula (1) and a compound having a hydrophilic group and a (meth)acryloyloxy group, an optically anisotropic medium using a photoalignment film comprised of the photoalignment film composition, and a method for preparing thereof:

[Chemical Formula 1]

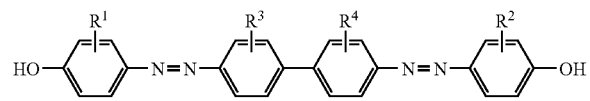

(1)

(wherein, $R^1$ and $R^2$ respectively and independently represent a hydrogen atom, halogen atom, carboxyl group or alkali metal salt thereof, halogenated methyl group, halogenated methoxy group, cyano group, nitro group, $-OR^5$, hydroxylalkyl group having 1 to 4 carbon atoms, $-CONR^6R^7$ or methoxycarbonyl group, and $R^3$ and $R^4$ respectively and independently represent a carboxyl group or alkali metal salt thereof, sulfo group or alkali metal salt thereof, nitro group, amino group, carbamoyl group, alkoxycarbonyl group, sulfamoyl group or hydroxyl group).

8 Claims, No Drawings

PHOTOALIGNMENT FILM COMPOSITION, OPTICALLY ANISOTROPIC MEDIUM AND METHOD FOR PREPARING THEREOF

TECHNICAL FIELD

The present invention relates to a photoalignment film composition useful for a liquid crystal alignment film of a liquid crystal display device or optically anisotropic medium, an optically anisotropic medium using a photoalignment film composed of the photoalignment film composition, and to a method for preparing thereof.

BACKGROUND ART

In a liquid crystal display apparatus, the state of the molecular alignment of the liquid crystal is altered by the action of an electric field and so forth to utilize the accompanying change in optical properties for displaying. In many cases, although the liquid crystal is used by injecting into a gap between two substrates, a liquid crystal alignment film is arranged on the insides of the substrates to align the liquid crystal molecules in a specific direction.

More recently, an optically anisotropic medium obtained by curing a polymerizable liquid crystal material in an aligned state has come to be used as an optical compensation sheet (phase difference plate), which is a kind of optically anisotropic medium, between liquid crystal cells and a polarizing plate, and a liquid crystal alignment film is also used as a material for aligning this polymerizable liquid crystal material.

So far, a rubbing film obtained by rubbing a polyimide or other polymer film with a cloth and so forth in one direction is used as a liquid crystal alignment film. However, in the case of rubbing methods, microflaws in the surface of the polymer film caused by mechanical rubbing cause liquid crystal alignment defects, and due to the non-uniformity of the pushing pressure applied during rubbing, uneven alignment occurs, thereby causing the problem of reduced definition of the liquid crystal device.

In addition, an optical compensation sheet (phase difference plate) is frequently used for the purpose of widening the wavelength band and increasing the accuracy of view angle stability, and in such cases, for example, a laminate of a ¼ wave plate or ½ wave plate, or a laminate of an A-plate and a C-plate is used. However, in the case of manufacturing this laminate, namely in the case of repeating the step of curing a polymerizable liquid crystal layer after fabricating a liquid crystal alignment film layer, if the polymerizable liquid crystal layer by rubbing, the apparatus becomes an extremely large scale and preventing continuous fabrication. Thus, there is a need for a method for obtaining a liquid crystal alignment film that enables all liquid crystal alignment film and liquid crystal layer lamination steps to be carried out continuously.

In order to solve these problems, attention has recently been focused on a technology for fabricating liquid crystal alignment films without the use of rubbing. In particular, a photoalignment method for obtaining alignment of liquid crystal by irradiating a film provided on a substrate with light having some degree of anisotropy is expected to be used practically as a result of having mass productivity and being able to accommodate large substrates.

Examples of compounds capable of serving as such photoalignment films include compounds engaged in photoisomerization reactions in the manner of derivatives of azobenzene, compounds having sites where photodimerization reactions occur such as cinnamate, coumarin or chalcones, and compounds causing anisotropic photodegradation of polyimides and so forth.

An azo compound like that represented by the following structural formula is an example of a photoalignment film material that realigns with anisotropic light currently having the lowest radiation dose (to be referred to as sensitivity) as well as superior crystal alignment ability (see, for example, Patent Document 1). Compounds having this azo structure demonstrate the ability to align liquid crystal at a low radiation dose of, for example, 500 mJ/cm$^2$.

However, since photoalignment films using these azo compounds are low molecular weight compounds, they were susceptible to damage by adhesive members such as sealants used in the liquid crystal cell manufacturing stage. In addition, in the manufacturing of a laminated optically anisotropic medium in which the photoalignment film and a polymerizable liquid crystal layer are repeatedly laminated, although this includes a step in which a polymerizable liquid crystal composition solution is coated onto a photoalignment film or a step in which a photoalignment film composition solution is coated onto a polymerizable liquid crystal layer, the previously fabricated liquid crystal alignment film layer or polymerizable liquid crystal layer is susceptible to damage by a solvent and so forth used in these coating solutions, thereby causing the film separation and preventing the obtaining of uniform optical characteristics. In addition, there was also the problem of deterioration of optical characteristics due to deterioration of the optical anisotropic layer caused by high temperatures generated at the liquid crystal cell manufacturing stage or in subsequent steps after obtaining the optical anisotropic layer by curing the polymerizable liquid crystal material in an aligned state.

[Chemical Formula 1]

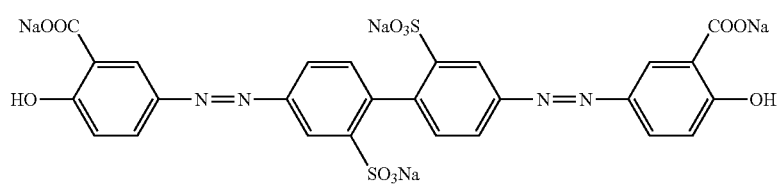

Compounds are known in which these azo compounds have been acrylated for the purpose of immobilization (see Patent Document 2). After these compounds have been aligned, the polymerized photoalignment film has superior light resistance. However, sensitivity decreases due to the acrylation, thereby making it difficult to realign at a low radiation dose. In addition, optically anisotropic mediums are known in which a laminated film, comprising a photoalignment polymerizable composition layer using these azo compounds and a polymerizable liquid crystal composition layer, is formed on a substrate, and both layers are polymerized in a state in which the liquid crystal composition having the polymerizing groups is aligned (see Patent Documents 3 and 4). This method is preferable for obtaining an optically anisotropic medium capable of introducing a bonding relationship between both of the photoalignment film layer and liquid crystal polymer layer and having superior adhesiveness and durability. However, since an acrylated azo compound is used, the problem of low sensitivity is unable to be solved. In addition, even an optically anisotropic medium using these azo compounds has the problems causing film separation or unable to uniform optical characteristics during manufacturing of optically anisotropic mediums in which a photoalignment film and polymerizable liquid crystal layer are repeatedly laminated.

[Patent Document 1] Japanese Unexamined Patent Application, First Publication No. H5-232473

[Patent Document 2] Japanese Unexamined Patent Application, First Publication No. 2002-250924

[Patent Document 3] Japanese Unexamined Patent Application, First Publication No. 2005-173547

[Patent Document 4] Japanese Unexamined Patent Application, First Publication No. 2005-173548

DISCLOSURE OF THE INVENTION

Problems to be Solved by the Invention

An object to be solved by the present invention is to provide a photoalignment film composition for a photoalignment film that has high sensitivity and is not damaged by adhesive members used in cell manufacturing processes or organic solvents used in adhesive members, polymerizable liquid crystal composition solutions or alignment film solutions and the like, an optically anisotropic medium that uses a photoalignment film composed of the photoalignment film composition and is not damaged by organic solvents and the like, and a method for preparing thereof.

Means for Solving the Problems

The inventors of the present invention found that the object can be solved with a photoalignment film composition in which a polymerizable compound that is compatible with a highly sensitive azo compound like that represented by the aforementioned chemical formula is added to the azo compound.

In general, although methods for increasing the crosslinked density of a coated film are known as methods for increasing the organic solvent resistance of a coated film and the like, the mixing of an ordinarily known (meth)acrylate and so forth into an azo compound caused considerable deterioration of the sensitivity and liquid crystal alignment ability of the azo compound.

The inventors of the present invention found that adding a compound having a hydrophilic group and a (meth)acryloyloxy group that is compatible with the azo compound is the most effective method for increasing organic solvent resistance (to be referred to as solvent resistance) without lowering sensitivity.

Since compounds having a hydrophilic group and a (meth) acryloyloxy group are compatible with the azo compound and have a small molecular volume prior to reacting, they do not obstruct the free volume of the compound. Since the azo compound is able to maintain free volume required for the structural change of photoisomerization, sensitivity and liquid crystal alignment ability are able to be retained. On the other hand, following polymerization of a compound having a hydrophilic group and a (meth)acryloyloxy group, the periphery of the azo compound is surrounded with a polymer in the form of a (meth)acrylic resin, and since the azo compound loses the free volume required for a photoisomerization reaction, there is no occurrence of alignment disturbance or separation caused by an organic solvent and the like. Since adhesiveness is also superior as a result of having a hydrophilic group, effects are also demonstrated on interfacial separation from the substrate.

Alternatively, in the case of fabricating an optically anisotropic medium, since a compound having a hydrophilic group and a (meth)acryloyloxy group polymerizes with polymerizable liquid crystal and integrates into a single unit, and as a result of having a hydrophilic group, has superior adhesiveness with the substrate, an optically anisotropic medium can be fabricated that is free of the occurrence of alignment disturbance or separation caused by an organic solvent and the like.

Moreover, the inventors of the present invention found that heat resistance can also be improved by further adding a specific compound to a mixture of the aforementioned compound and a compound having a hydrophilic group and a (meth)acryloyloxy group. As a result of using this composition as a composition for a photoalignment film, a photoalignment film or an optically anisotropic medium can be fabricated that is not damaged by organic solvent and has superior heat resistance.

Namely, the present invention provides a photoalignment film composition containing a compound represented by general formula (1) and a compound having a hydrophilic group and a (meth)acryloyloxy group:

[Chemical Formula 2]

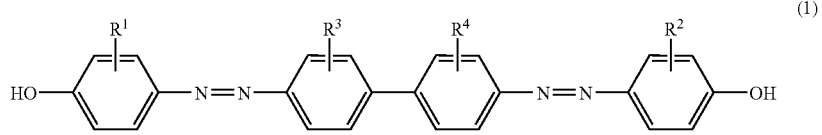

(wherein, $R^1$ and $R^2$ respectively and independently represent a hydrogen atom, halogen atom, carboxyl group or alkali metal salt thereof, halogenated methyl group, halogenated methoxy group, cyano group, nitro group, —$OR^5$ (provided that $R^5$ represents an alkyl group having 1 to 6 carbon atoms, a cycloalkyl group having 3 to 6 carbon atoms, or an alkyl group having 1 to 6 carbon atoms substituted with an alkoxy group having 1 to 6 carbon atoms), hydroxylalkyl group having 1 to 4 carbon atoms, —$CONR^6R^7$ (provided that $R^6$ and $R^7$ respectively and independently represent a hydrogen atom or an alkyl group having 1 to 6 carbon atoms) or methoxycarbonyl group, and $R^3$ and $R^4$ respectively and independently represent a carboxyl group or alkali metal salt thereof, sulfo group or alkali metal salt thereof, nitro group, amino group, carbamoyl group, alkoxycarbonyl group, sulfamoyl group or hydroxyl group).

In addition, the present invention provides an optically anisotropic medium obtained by polymerizing a polymerizable liquid crystal composition film fabricated on a liquid crystal alignment film in an aligned state, wherein the liquid crystal alignment film is obtained by aligning the photoalignment film composition described above.

In addition, the present invention provides a method for preparing an optically anisotropic medium comprising the successive steps of: a step 1, in which a film of the previously described photoalignment film composition is fabricated on a substrate, a step 2 in which a polymerizable liquid crystal composition film is fabricated on the film of the photoalignment film composition, and a step 3, in which a compound having a hydrophilic group and a (meth)acryloyloxy group and a polymerizable liquid crystal composition are polymerized while aligning the compound represented by general formula (1) and the liquid crystal molecules by irradiating with anisotropic light.

In addition, the present invention provides a method for preparing an optically anisotropic medium comprising the successive steps of: a step 1, in which a film of the previously described photoalignment film composition is fabricated on a substrate, a step 2, in which the compound represented by general formula (1) is aligned by irradiating the film of the photoalignment film composition with anisotropic light, a step 3, in which a polymerizable liquid crystal composition is fabricated on the film of the photoalignment film composition, and a step 4, in which a compound having a hydrophilic group and a (meth)acryloyloxy group and the polymerizable liquid crystal composition are polymerized by heat or light.

In addition, the present invention provides a method for preparing an optically anisotropic medium comprising the successive steps of: a step 1, in which a film of the previously described photoalignment film composition is fabricated on a substrate, a step 2, in which the compound represented by general formula (1) is aligned by irradiating the film of the photoalignment film composition with anisotropic light, a step 3, in which a compound having a hydrophilic group and a (meth)acryloyloxy group is polymerized with heat or light, a step 4, in which a polymerizable liquid crystal composition film is fabricated on the film of the photoalignment film composition, and a step 5, in which the polymerizable liquid crystal composition is polymerized with heat or light.

In addition, the present invention provides a method for preparing an optically anisotropic medium comprising the successive steps of: a step 1, in which a film of the previously described photoalignment film composition is fabricated on a substrate, a step 2, in which a compound having a hydrophilic group and (meth)acryloyloxy group is polymerized while aligning the compound represented by general formula (1) by irradiating the film of the photoalignment film composition with anisotropic light, a step 3, in which a polymerizable liquid crystal composition is coated on the film of the photoalignment film composition and aligned, and a step 4, in which the polymerizable liquid crystal composition is polymerized with heat or light.

Effects of the Invention

As a result of using the photoalignment film composition of the present invention, a photoalignment film having high sensitivity and is not damaged by adhesive members used in cell manufacturing processes or organic solvents used in adhesive members, polymerizable liquid crystal composition solutions or alignment film solutions and the like, and an optically anisotropic medium that uses the photoalignment film and is not damaged by organic solvents and the like, are obtained.

BEST MODE FOR CARRYING OUT THE INVENTION

[Chemical Formula 3]

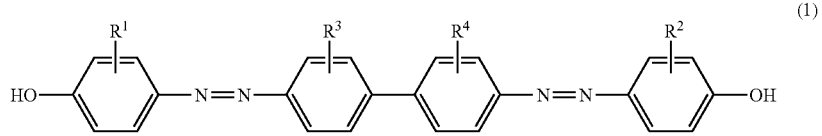

(1)

(Compounds Represented by General Formula (2-2))

In general formula (1), $R^1$ and $R^2$ respectively and independently represent a hydrogen atom, halogen atom, carboxyl group or alkali metal salt thereof, halogenated methyl group, halogenated methoxy group, cyano group, nitro group, —$OR^5$ (provided that $R^5$ represents an alkyl group having 1 to 6 carbon atoms, a cycloalkyl group having 3 to 6 carbon atoms, or an alkyl group having 1 to 6 carbon atoms substituted with an alkoxy group having 1 to 6 carbon atoms), hydroxylalkyl group having 1 to 4 carbon atoms, —$CONR^6R^7$ (provided that $R^6$ and $R^7$ respectively and independently represent a hydrogen atom or an alkyl group having 1 to 6 carbon atoms) or methoxycarbonyl group.

Examples of halogen atoms include fluorine atoms and chlorine atoms. Examples of alkali metals of alkali metal salts of carboxyl groups include lithium, sodium and potassium. Examples of halogenated methyl groups include trichloromethyl and trifluoromethyl groups. Examples of halogenated methoxy groups include chloromethoxy and trifluoromethoxy groups.

Examples of alkyl groups having 1 to 6 carbon atoms of $R^5$ include methyl, ethyl, propyl, butyl, pentyl, hexyl and 1-methylethyl groups. Examples of alkyl groups having 1 to 6 carbon atoms substituted with alkoxy groups having 1 to 6 carbon atoms represented by $R^5$ include methoxymethyl, 1-ethoxyethyl and tetrahydropyranyl groups.

Examples of hydroxylalkyl groups having 1 to 4 carbon atoms include hydroxylmethyl, 1-hydroxylethyl, 2-hydroxylethyl, 1-hydroxylpropyl, 2-hydroxylpropyl, 3-hydroxylpropyl and 1-hydroxylbutyl groups.

Examples of alkyl groups having 1 to 6 carbon atoms represented by $R^6$ and $R^7$ include methyl, ethyl, propyl, butyl, pentyl, hexyl and 1-methylethyl groups.

Among these groups, halogen atoms, carboxyl groups, halogenated methyl groups, halogenated methoxy groups, methoxy groups, ethoxy groups, propoxy groups, hydroxylmethyl groups, carbamoyl groups, dimethylcarbamoyl groups and cyano groups are preferable, while carboxyl groups, hydroxylmethyl groups and trifluoromethyl groups are particularly preferable from the standpoint of allowing the obtaining of excellent alignment.

In addition, substitution of $R^1$ and $R^2$ at the meta-positions as viewed from the azo group of the phenylene groups on both ends of the 4,4'-bis(phenylazo) biphenyl backbone is particularly preferable from the standpoint of obtaining superior photoalignment.

$R^3$ and $R^4$ respectively and independently represent a carboxyl group or alkali metal salt thereof, sulfo group or alkali metal salt thereof, nitro group, amino group, carbamoyl group, alkoxycarbonyl group, sulfamoyl group, or hydroxyl group. Examples of alkali metals of the alkali metal salts of the carboxyl and sulfo groups include lithium, sodium and potassium. Substitution of these $R^3$ and $R^4$ at the 2,2' positions of the 4,4'-bis(phenylazo) biphenyl backbone is particularly preferable from the standpoint of superior photoalignment.

$R^3$ and $R^4$ in general formula (1) are presumed to be the sites having the greatest influence on photoalignment ability and other properties, and various properties are obtained depending on the types and combinations of substituents able to be introduced into $R^3$ and $R^4$.

If the $R^3$ and $R^4$ are carboxyl groups or alkali metal salts thereof or sulfo groups or alkali metal salts thereof, affinity for glass, ITO and other transparent electrodes is high, and a photoalignment film can be uniformly formed on a substrate surface, thereby making this preferable. In addition, if the $R^3$ and $R^4$ are carbamoyl groups or sulfamoyl groups, an optically anisotropic medium obtained by polymerizing a polymerizable liquid crystal on the resulting photoalignment film demonstrates high heat resistance, which is useful in applications requiring heat resistance.

A compound represented by the general formula (1) may be used alone or a plurality of compounds in which $R^1$ to $R^4$ each differ within the range of compounds represented by general formula (1) may be used as a mixture thereof. In the case of using a plurality of compounds as a mixture, the use of a mixture of a compound in which $R^3$ and $R^4$ are sulfo groups or alkali metal salts thereof and a compound in which $R^3$ and $R^4$ are carbamoyl groups or sulfamoyl groups is preferable since they are able to contribute to adhesiveness of the resulting photoalignment film and optically anisotropic medium to the substrate and to heat resistance.

In particular, a compound (1-1), in which $R^3$ and $R^4$ in the general formula (1) are sulfo groups or alkali metal salts thereof, and a compound represented by general formula (2-1) are preferably contained. In this case, in compound (1-1), $R^1$ and $R^2$ are preferably carboxyl groups or alkali metal salts thereof, hydroxymethyl groups or trifluoromethyl groups, more preferably carboxyl groups or alkali metal salts thereof or hydroxylmethyl groups, and particularly preferably carboxyl groups or alkali metal salts thereof.

(Compounds Represented by General Formula (2-1))

(meth)acryloyloxy group, (meth)acryloyloxy group, (meth)acrylamide group, vinyl group, vinyloxy group and maleimide group.

$X^{11}$ represents a single bond in the case $R^{11}$ represents a hydroxyl group, or represents a linking group represented by $-(A^1-B^1)_m-$ in the case $R^{11}$ represents a polymerizable functional group, and $X^{12}$ represents a single bond in the case $R^{12}$ represents a hydroxyl group, or represents a linking group represented by $-(A^2-B^2)_n-$ in the case $R^{12}$ represents a polymerizable functional group. Here, $A^1$ is bonded to $R^{11}$, while $A^2$ is bonded to $R^{12}$.

$A^1$ and $A^2$ respectively and independently represent a single bond or a divalent hydrocarbon group, and $B^1$ and $B^2$ respectively and independently represent a single bond, —O—, —CO—O—, —O—CO—, —CO—NH—, —NH—CO—, —NH—CO—O— or —O—CO—NH—. m and n respectively and independently represent an integer of 0 to 4. However, when m or n is 2 or more, the plurality of $A^1$, $B^1$, $A^2$ and $B^2$ may be the same or different, provided that $A^1$ or $A^2$ interposed between two $B^1$ or $B^2$ is not a single bond.

$R^{13}$ and $R^{14}$ respectively and independently represent a hydrogen atom, halogen atom, carboxyl group or alkali metal salt thereof, halogenated methyl group, halogenated methoxy group, cyano group, nitro group, —$OR^{17}$ (provided that $R^{17}$ represents an alkyl group having 1 to 6 carbon atoms, a cycloalkyl group having 3 to 6 carbon atoms, or an alkyl group having 1 to 6 carbon atoms substituted with an alkoxy group having 1 to 6 carbon atoms), hydroxylalkyl group having 1 to 4 carbon atoms, —$CONR^{18}R^{19}$ (provided that $R^{18}$ and $R^{19}$ respectively and independently represent a hydrogen atom or an alkyl group having 1 to 6 carbon atoms) or methoxycarbonyl group.

$R^{15}$ and $R^{16}$ respectively and independently represent a carbamoyl group or sulfamoyl group.

Among the compounds represented by the general formula (2-1), compounds in which $R^{11}$ and $R^{12}$ are hydroxyl groups are compounds within the scope of the general formula (1).

Compounds represented by the general formula (2-1) may be used alone or a plurality of different compounds within the scope of compounds represented by general formula (2-1) may be used as a mixture thereof.

Among the compounds represented by the general formula (2-1), compounds in which $R^{11}$ and $R^{12}$ are hydroxyl groups and $R^{13}$ and $R^{14}$ are hydroxylalkyl groups having 1 to 4 carbon atoms are preferable, while compounds in which $R^{11}$ and $R^{12}$ are hydroxyl groups and $R^{13}$ and $R^{14}$ are hydroxylmethyl groups are particularly preferable.

Similar effects can be obtained even if a compound represented by general formula (2-2) or a triphenylene (2-3) having a hydroxyl group as a substituent is added, instead of the compounds represented by the general formula (2-1). Furthermore, compounds represented by the general formula

[Chemical Formula 4]

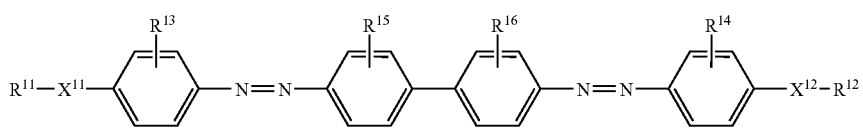

(2-1)

In general formula (2-1), $R^{11}$ and $R^{12}$ respectively and independently represent a hydroxyl group or a polymerizable functional group selected from the group consisting of a (2-1), compounds represented by the general formula (2-2) and compounds represented by the general formula (2-3) are collectively referred to as compound (2).

Compounds in which $R^{21}$ and $R^{22}$ are respectively and independently a hydrogen atom, methyl group or methoxy group are preferable for compounds represented by the general formula (2-2).

(Compounds Represented by General Formula (2-2))

[Chemical Formula 5]

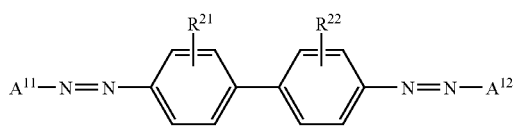

(2-2)

In general formula (2-2), $R^{21}$ and $R^{22}$ respectively and independently represent a hydrogen atom, alkyl group having 1 to 6 carbon atoms or alkoxy group having 1 to 6 carbon atoms, and A11 and A12 respectively and independently represent a naphthalene ring having an amino group, and a sulfo group or an alkali metal salt thereof as a substituent, or a benzene ring having an amino group, and a sulfo group or an alkali metal salt thereof as a substituent.

A compound represented by the general formula (2-2) may be used alone or a plurality of compounds differing within the range of compounds represented by general formula (2-2) may be used as a mixture thereof.

(Triphenylene (2-3) Having a Hydroxyl Group as a Substituent)

Although there are no particular limitations on the number of substituent hydroxyl groups in triphenylene (2-3) having a hydroxyl group as a substituent, the number of hydroxyl groups is preferably 3 to 6 and most preferably 6.

At least one compound (2) selected from the group consisting of compounds represented by the general formula (2-1), compounds represented by the general formula (2-2) and the triphenylene (2-3) having a hydroxyl group as a substituent is added such that the ratio of the compound (1-1) to the compound (2) is preferably within the range of 1:0.2 to 1:5, and more preferably within the range of 1:0.5 to 1:2.

Examples of compounds represented by general formula (1) used in the present invention include compounds having the structures shown below.

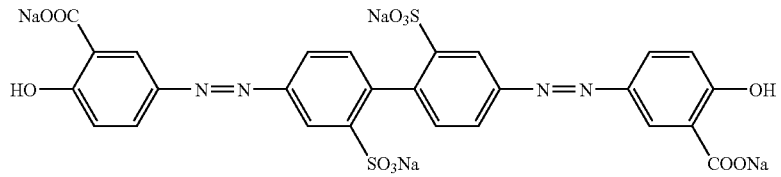

[Chemical Formula 6]

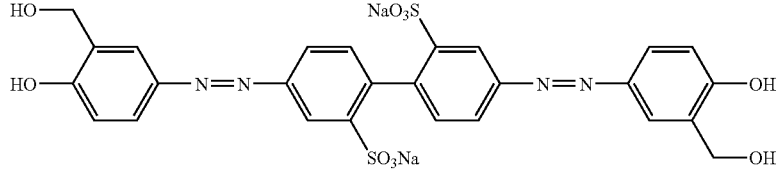

[Chemical Formula 7]

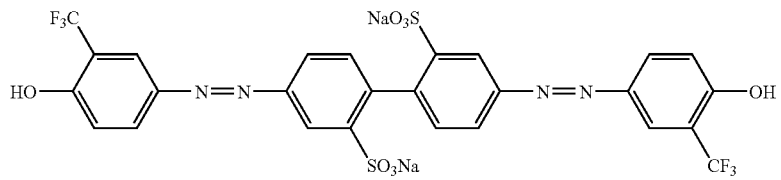

[Chemical Formula 8]

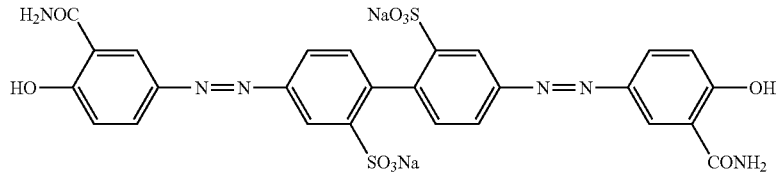

[Chemical Formula 9]

Examples of compounds represented by general formula (2-1) used in the present invention include compounds having the structures shown below.
[Chemical Formula 10]
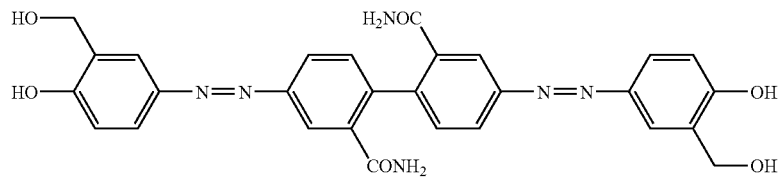
[Chemical Formula 11]
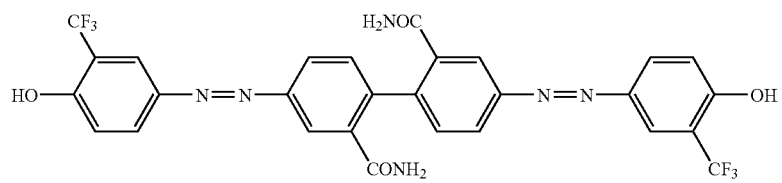
[Chemical Formula 12]
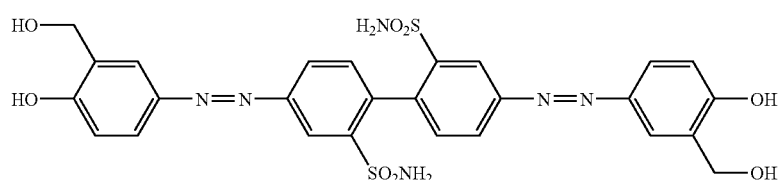
[Chemical Formula 13]
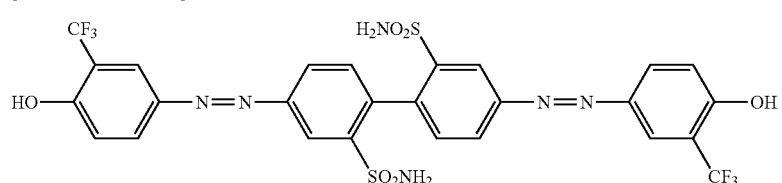
[Chemical Formula 14]
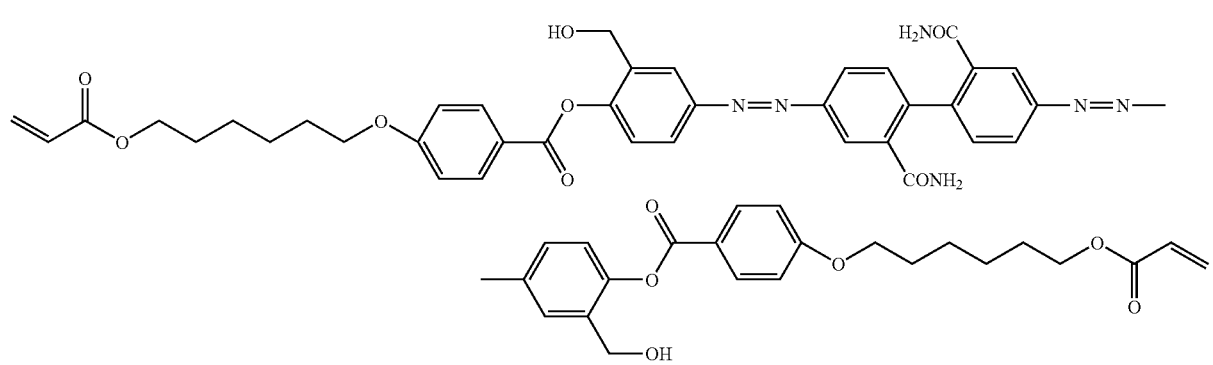
[Chemical Formula 15]
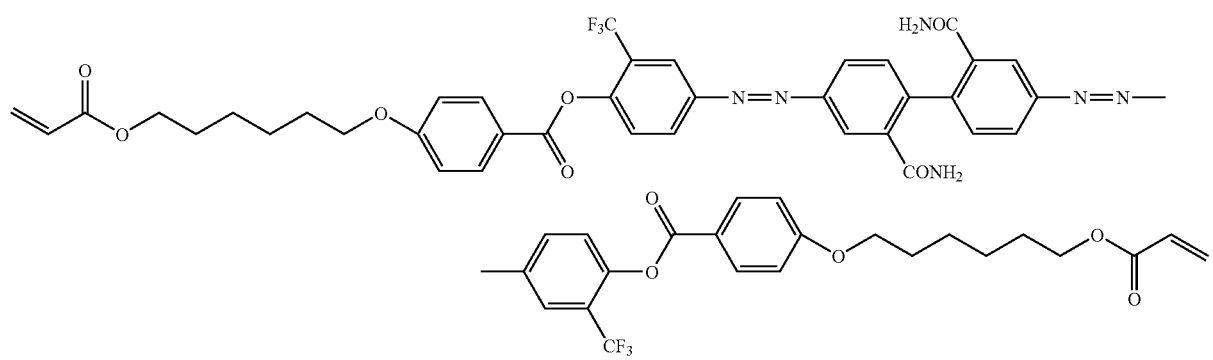

[Chemical Formula 16]
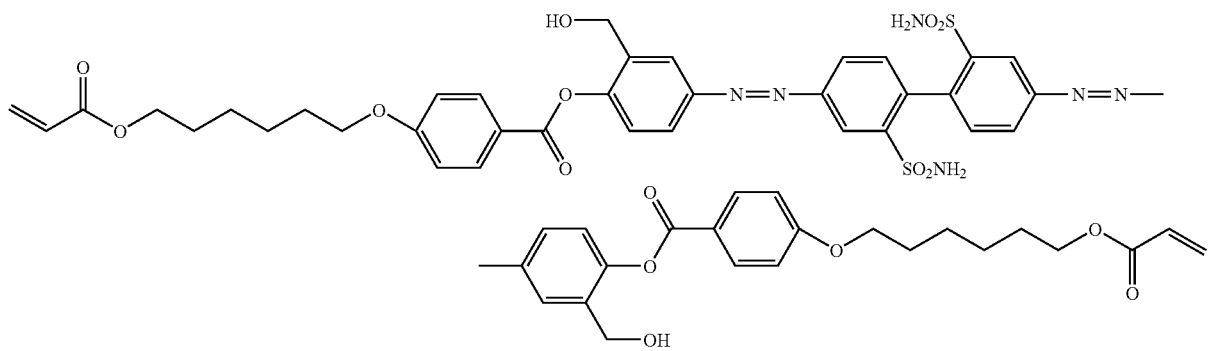
[Chemical Formula 17]
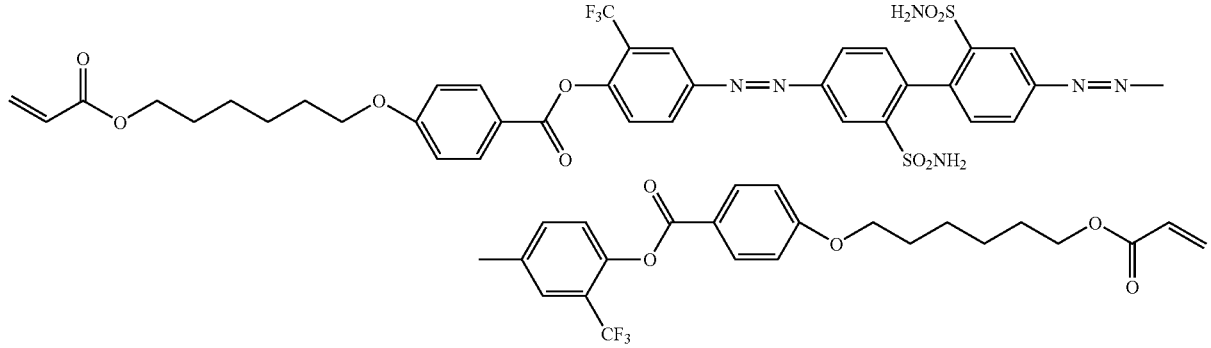
Examples of compounds represented by general formula (2-2) used in the present invention include compounds having the structures shown below.
[Chemical Formula 18]
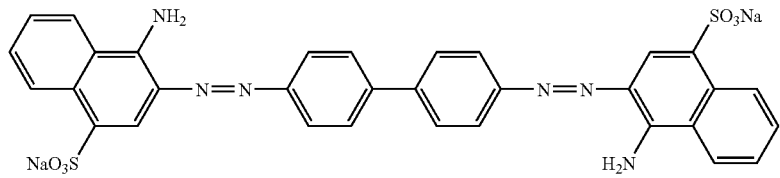
[Chemical Formula 19]
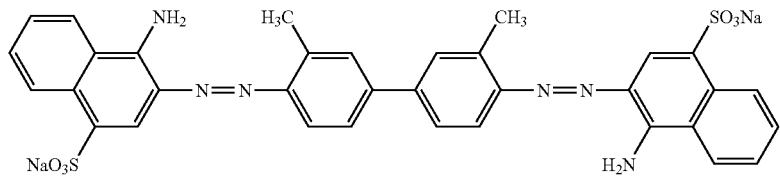
[Chemical Formula 20]
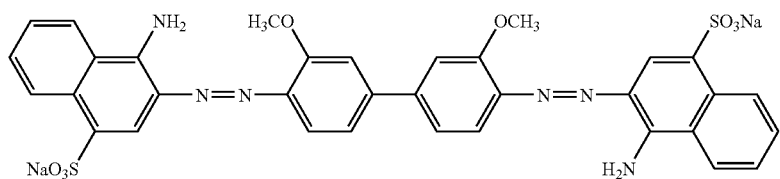
[Chemical Formula 21]     [Chemical Formula 22]

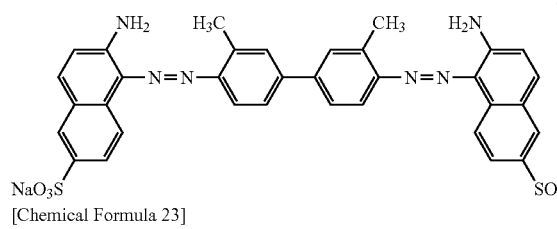
[Chemical Formula 23]

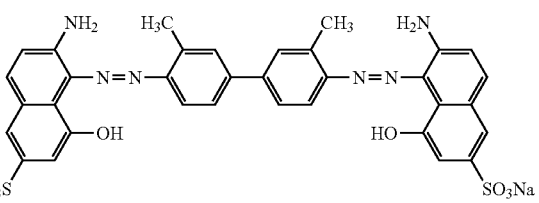

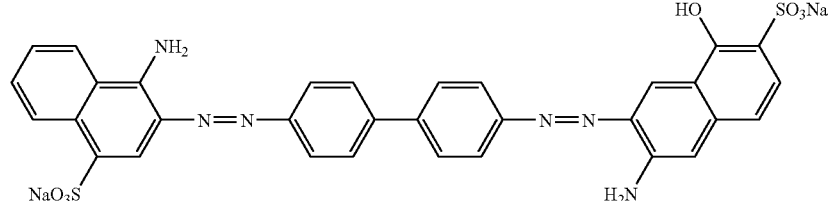
[Chemical Formula 24]

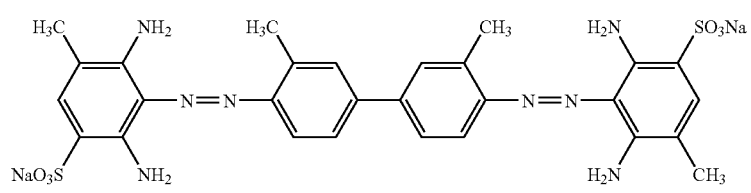
[Chemical Formula 25]

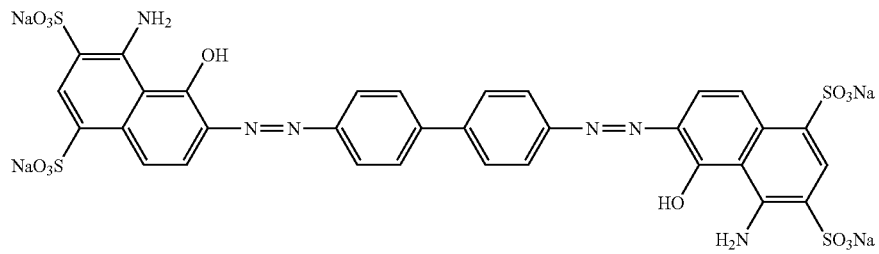

An example of the triphenylene (2-3) having a hydroxyl group as a substituent used in the present invention include a compound having the structure shown below.

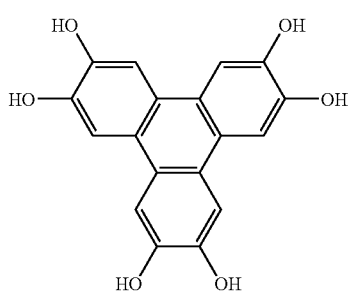
[Chemical Formula 26]

A compound represented by general formula (1) demonstrates high solubility in water or polar organic vehicles, and demonstrates satisfactory affinity for glass and the like. A uniform and stable photoalignment film can be formed on a substrate simply by coating a photoalignment film composition obtained by dissolving this compound in water or a polar organic vehicle onto a substrate such as glass followed by removing the water or polar organic vehicle.

(Compounds Having a Hydrophilic Group and (Meth)acryloyloxy Group)

Examples of the hydrophilic group of compounds having a hydrophilic group and (meth)acryloyloxy group used in the present invention include a hydroxyl group, carboxyl group, sulfo group and amino group. Among these, (meth)acrylates having a hydroxyl group or a carboxyl group are preferable due to their favorable miscibility with compounds represented by general formula (1). There are no particular limitations on the number of (meth)acryloyloxy groups per molecule, and there may be one such group or two or more. The practical range of the number of (meth)acryloyloxy groups is 1 to 6 and preferably 1 to 4.

In addition, in consideration of heat during drying and so forth applied when manufacturing a photoalignment film or optically anisotropic medium, the boiling point at 1 atmosphere of compounds having a hydrophilic group and a (meth)acryloyloxy group used in the present invention is preferably 100° .C. or higher.

In addition, although there are no particular limitations on molecular weight or viscosity since the photoalignment film composition of the present invention is ordinarily used after diluting with a vehicle, the preferable range of molecular weight is a number average molecular weight of 100 to 5000, while a range of 150 to 2000 is practical and preferable.

Compounds having two or more hydroxyl groups are particularly preferable as compounds having a hydroxyl group and a (meth)acryloyloxy group due to their high hydrophilicity.

Specific examples of such compounds include monoglycidyl ethers such as glycidyl (meth)acrylate, diglycidyl ethers of divalent alcohols such as propylene glycol, butanediol, pentanediol, hexanediol, diethylene glycol, dipropylene glycol, triethylene glycol, tripropylene glycol, tetraethylene glycol, polyethylene glycol, polypropylene glycol, neopentyl glycol, hydroxypivalic acid neopentyl glycol, bisphenol A or ethoxified bisphenol A, triglycidyl ethers of trivalent alcohols such as trimethylol propane, ethoxified trimethylol propane, propoxified trimethylol propane or glycerin, epoxy (meth) acrylate compounds obtained by reacting (meth)acrylic acid with a glycidyl group of a glycidyl ether compound such as a polyglycidyl ether of a polyvalent alcohol having at least one aromatic or aliphatic ring (the polyvalent phenol referred to here includes a bisphenol compound such as bisphenol A, bisphenol F or bisphenol S, alkylene oxide addition products of bisphenol compounds, and phenol novolak, cresol novolak or alkylene oxide addition products thereof), and alcoholic (meth)acrylate compounds obtained by reacting (meth) acrylic acid with a portion of the hydroxyl groups of polyols such as pentaerythritol di(meth)acrylate, pentaerythritol tri (meth)acrylate, dipentaerythritol di(meth)acrylate, dipentaerythritol tri(meth)acrylate, dipentaerythritol penta(meth) acrylate, glycerin di(meth)acrylate, trimethylol propane di(meth)acrylate, ditrimethylol propane di(meth)acrylate, ditrimethylol propane tri(meth)acrylate, ditrimethylol propane tetra(meth)acrylate, ditrimethylol propane hexa(meth) acrylate, ethoxified trimethylol propane di(meth)acrylate, propoxified trimethylol propane di(meth)acrylate and tris-2-hydroxyethylisocyanurate di(meth)acrylate.

Since compounds having a carboxyl group and a (meth) acryloyloxy group have sufficiently high hydrophilicity of the carboxyl group, there are no particular limitations on the number of carboxyl groups per molecule, and the number of carboxyl groups may be one or two or more. However, since solubility with respect to solvents becomes poor and the crystallinity of the compound becomes higher as the number of carboxyl groups increases, the fewer the number of carboxyl groups the better provided that the number is within a range that does not impair resistance to adhesive members or solvents. In the case of compounds having a carboxyl group coupled directly to an aromatic ring, the number of carboxyl groups per molecule is preferably two or less.

Specific examples include compounds having a carboxyl group and at least one (meth)acryloyloxy group in a molecule thereof such as 2-(meth)acryloyloxyethyl hexa hydrophthalate, 2-acryloyloxyethyl phthalate, 2-methacryloyloxyethyl phthalate or ethylene oxide-modified succinyl acrylate, compounds obtained by adding an acid anhydride such as phthalic anhydride to a compound having a hydroxyl group and a (meth)acryloyloxy group such as 2-hydroxylethyl (meth) acrylate, and benzoic acid derivatives having an alkyl(oxy) group containing a (meth)acryloyloxy group on a terminal thereof as a substituent.

In the case of the benzoic acid derivative, although the number of substituents in the form of the alkyl(oxy) groups containing a (meth)acryloyloxy group on a terminal thereof may be one or more, 1 to 3 substituents is preferable in terms of ease of synthesis. In addition, in the case of introducing an alkyl(oxy) group containing a (meth)acryloyloxy group on a plurality of terminals thereof, selecting a location for the substituted location such that the molecular symmetry is reduced is preferable in terms of preventing crystallinity from being excessively high. specific examples of which include compounds in which the number of methylene groups of the alkyl chain is 1 to 14, such as 2-(ω-(meth)acryloyloxyalkyl (oxy)) benzoic acid, 2,3-di(ω-(meth)acryloyloxyalkyl(oxy)) benzoic acid, 2,4-di(ω-(meth)acryloyloxyalkyl(oxy)) benzoic acid, 2,5-di(ω-(meth)acryloyloxyalkyl(oxy)) benzoic acid, 3-(ω-(meth)acryloyloxyalkyl(oxy)) benzoic acid, 3,4-di(ω-(meth)acryloyloxyalkyl(oxy)) benzoic acid and 4-(ω-(meth)acryloyloxyalkyl(oxy)) benzoic acid. The number of methylene groups is particularly preferably 2 to 10.

Examples of commercially available compounds having a carboxyl group and a (meth)acryloyloxy group include "Light Acrylate HOAHH", "Light Acrylate HOHH", "Light Acrylate HOMPL", "Light Acrylate HOMPP" and "Light Acrylate HOA-MS" manufactured by Kyoeisha Chemical Co., Ltd.

One type of the compounds having a hydrophilic group and a (meth)acryloyloxy group, or a mixture of two or more types, may be used.

In addition, since the compounds having a hydrophilic group and a (meth)acryloyloxy group have high hydrophilicity, although they have satisfactory compatibility with compounds represented by general formula (1), there are rarely combinations in which crystallization occurs. In such cases, since there is the risk of having an effect on anchoring force as a result of being unable to obtain a smooth film, a combination of the compound having a hydrophilic group and a (meth) acryloyloxy group and a compound represented by general formula (1) that does not result in remarkably high crystallinity in the blended state is preferable. The presence or absence of crystallization can be assessed by, for example, optical observation, spectral analysis or a scattering experiment.

Although there are no particular limitations on the mixing ratio between the compound represented by general formula (1) and the compound having a hydrophilic group and a (meth)acryloyloxy group, since there is the possibility of being unable to obtain adequate anchoring force if the added amounts of these compounds are excessively low, and there is the possibility of being unable to obtain adequate resistance to adhesive agents or solvents if the added amount of the compound having a hydrophilic group and a (meth)acryloyloxy group is excessively low, normally the compound having a hydrophilic group and a (meth)acryloyloxy group is preferably within the range of 10 to 90% by mass, more preferably within the range of 20 to 85% by mass, even more preferably within the range of 20 to 80% by mass and particularly preferably within the range of 30 to 80% by mass based on the total amount of non-volatile components in the composition. In addition, the mixing ratio between the compound represented by general formula (1) and the compound having a hydrophilic group and a (meth)acryloyloxy group is preferably such that crystallinity does not become excessively high in the blended state.

A photoalignment film using the photoalignment film composition of the present invention can be preferably used as an alignment film of general-purpose liquid crystal used in display devices such as nematic liquid crystal, or as an alignment film of a polymerizable liquid crystal composition used during fabrication of an optically anisotropic medium.

(Solvent)

The photoalignment film composition used in the present invention normally uses a vehicle for the purpose of improving coatability. Although there are no particular limitations on the solvent used for the vehicle, a vehicle is preferably used that demonstrates satisfactory compatibility with the compounds described above, examples of which include alcohol-based solvents such as methanol or ethanol, diol-based solvents such as ethylene glycol, propylene glycol or 1,3-butanediol, ether-based solvents such as tetrahydrofuran, 2-methoxyethanol, 2-butoxyethanol, 2-(2-ethoxyethoxy)

ethanol or 2-(2-butoxyethoxy)ethanol, amide-based solvents such as 2-pyrrolidone, N-methylpyrrolidone, dimethylformamide or dimethylacetoamide, γ-butyrolactone, chlorobenzene and dimethylsulfoxide. These can be used alone or two or more types can be used in combination. In addition, known, commonly used additives may also be added within a range that does not impair the effects of the present invention.

Normally, the photoalignment film composition of the present invention is prepared to have a solid component ratio of 0.2% by mass or more, and preferably to have a solid component ratio of 0.5 to 10% by mass in particular.

(Additives)

General-purpose additives can be used to uniformly coat the photoalignment film composition used in the present invention and obtain a photoalignment film having uniform film thickness. For example, a leveling agent, thixo agent, surfactant, ultraviolet absorber, infrared absorber, antioxidant, surface treatment agent or other additives can be added to a degree that does not remarkably reduce the alignment ability of the liquid crystal.

(Process for Producing a Photoalignment Film and an Optically Anisotropic Medium or Optical Device Having a Photoalignment Film)

In order to obtain a photoalignment film using the photoalignment film composition of the present invention, after coating the photoalignment film composition on a substrate and drying, the dried photoalignment film composition is irradiated with ultraviolet light or anisotropic light such as visible light to align the compound represented by general formula (1). A compound having a hydrophilic group and a (meth)acryloyloxy group is then polymerized with light or heat either simultaneously or subsequently to irradiation to obtain a photoalignment film.

(Coating and Substrate)

The photoalignment film composition used in the present invention is coated or printed on a substrate by a known, commonly used method such as spin coating, gravure printing, flexographic printing, ink jet printing, die coating, cap coating or dipping followed by drying to obtain a film. The substrate used is a substrate ordinarily used in liquid crystal display devices and optically anisotropic mediums, and there are no particular limitations thereon provided it is a material having solvent resistance and heat resistance able to withstand drying following coating of a solution of the photoalignment film composition or heating during production of a liquid crystal device. Examples of such substrates include glass substrates, ceramic substrates, metal substrates and polymer substrates. Examples of polymer substrates that can be used include those made of cellulose derivatives, polycycloolefin derivatives, polyester, polyolefin, polycarbonate, polyacrylate, polyarylate, Nylon or polystyrene. These substrates may be surface-treated to improve coatability and adhesion of the photoalignment film composition. Examples of surface treatment include ozone treatment and plasma treatment. In addition, an organic thin film, inorganic oxide thin film or metal thin film and the like may be provided by a method such as deposition on the substrate surface to adjust transmittance and reflectance of light.

Normally, the substrate is coated with a solution diluted with an organic solvent followed by drying to obtain a photoalignment film. Heating is preferably used for drying in the case of drying.

(Photoisomerization Step)

A photoisomerized photoalignment film is fabricated by irradiating a photoalignment film composition obtained as described above with anisotropic light to impart a liquid crystal alignment function (to be referred to simply as a photoisomerization step). Examples of anisotropic light used in the photoisomerization step include polarized light such as linearly polarized light or elliptically polarized light, or non-polarized light radiated from a direction at an angle to the substrate surface. Although linearly polarized light or elliptically polarized light may be used for the polarized light, linearly polarized light having a high extinction ratio is used preferably to efficiently carry out photoalignment.

In addition, since it is necessary to use a polarizing filter and the like to obtain polarized light in a light radiation apparatus, although this has the disadvantage of reducing the intensity of light radiated onto the film surface, if a method is used in which non-polarized light is radiated from a direction at an angle to the film surface, a polarizing filter and the like is not required by the radiation apparatus, thereby offering the advantages of being able to obtain high radiation intensity and shortening the duration of radiation for photoalignment. The incident angle of the non-polarized light at this time is preferably within the range of 10° to 80° relative to the normal of the substrate, while the incident angle is more preferably 20° to 60°, and most preferably 45°, in consideration of uniformity of energy radiated onto the irradiated surface, the resulting pretilt angle, alignment efficiency and so forth.

The radiated light is light of a wavelength band that is absorbed by photoaligning groups of the compound used. For example, in the case a photoaligning group has an azobenzene structure, Ultraviolet light within a wavelength range of 330 to 500 nm having strong absorption by the $\pi \rightarrow \pi^*$ transition of azobenzene is particularly preferable.

Examples of the light source of the radiated light include ultraviolet light sources such as a xenon lamp, high-pressure mercury lamp, ultra-high-pressure mercury lamp or metal halide lamp, ultraviolet lasers such as a KrF or ArF laser, and visible light lasers such as an Ar ion laser. In the case a photoaligning group has an azobenzene structure in particular, an ultra-high-pressure mercury lamp having a particularly large ultraviolet light emission intensity at 365 nm can be used effectively.

Linearly polarized ultraviolet light can be obtained by passing the light from the light source through a polarizing filter or a polarizing prism such as a Glan-Thompson prism or Glan-Taylor prism.

In addition, regardless of whether using polarized light or non-polarized light, the radiated light is particularly preferably in the form of nearly parallel light rays.

In addition, when radiating polarized light, the use of a photomask makes it possible to impart liquid crystal alignment ability in two or more different directions in the form of a pattern to the photoalignment film. More specifically, after coating and drying the photoalignment film composition of the present invention, the substrate is covered with a photomask and the entire surface thereof is irradiated with polarized light or non-polarized light to impart a crystal alignment ability to the exposed portion in the form of a pattern. This can be repeated a plurality of times as necessary to impart a crystal alignment ability in a plurality of directions.

Moreover, the photoalignment film can also be cooled following the photoisomerization step depending on the case. The cooling method is preferably that which cools the photoisomerized photoalignment film, and the entire substrate can be cooled by a known, commonly used cooling apparatus such as a cold plate, chamber or constant low-temperature apparatus.

Although cooling conditions consist of a cooling temperature of 20° C. for 1 minute or more unless the cooling temperature is lower than 20° C. Although the cooling temperature is equal to or higher than the melting point of the solvent used, it is preferably within the range of 40 to 20° C. The cooling temperature is preferably 10° C. or lower in order to obtain a more stable photoalignment film having an improved liquid crystal alignment function, and the cooling time is preferably 5 minutes or more. Moreover, the cooling temperature is preferably 5° C. or lower to shorten cooling time.

In addition, cooling may be carried out in a dry air, nitrogen or argon atmosphere during cooling to prevent condensation of moisture, or cooling may be carried out while blowing dry air or nitrogen and the like onto the substrate.

(Polymerization Step)

In the case of using as a photoalignment film, the compound having a hydrophilic group and a (meth)acryloyloxy group is polymerized following the photoisomerization step. In this case, a photopolymerization initiator described below is preferably added. Although the polymerization method may be by irradiation with light or heat, in the case of carrying out by irradiating with light, it is preferably carried out at a wavelength other than the absorption band of the azobenzene backbone to prevent disturbance of the aligned state obtained in the photoisomerization step. Although such light is specifically ultraviolet light having a wavelength of 320 nm or less, in the case ultraviolet light having a wavelength of 320 nm or less causes degradation of the photoalignment film or polymerizable liquid crystal composition, polymerization treatment may also be preferably carried out with ultraviolet light having a wavelength of 320 nm or more.

In order to prevent disturbance of the alignment of the previously obtained azobenzene backbone by ultraviolet light at a wavelength of 320 nm or more, normally a photopolymerization initiator is used that preferably has a photoabsorption wavelength different from the photoabsorption band of the azobenzene backbone. In addition, a compound that induces a polymerization reaction by causing energy transfer to the polymerization initiator by absorbing light of a longer wavelength than the absorption band of an ordinary photopolymerization initiator may be mixed. As a result, polymerization can be carried out without disturbing the aligned state of the photoalignment film composition immobilized in the photoalignment procedure. On the other hand, in the case of radiating light for polymerization from the same direction as the photoalignment procedure, or if polarized light is radiated having a plane of polarization perpendicular to the absorption transition moment of the azobenzene backbone, an arbitrary wavelength can be used since there is no risk of disturbing the resulting aligned state.

For example, if a polymerization initiator is added to a photoalignment material and light is radiated so as to align the photoalignment material, photoalignment and photopolymerization can be carried out simultaneously. In addition, by carrying out photoalignment is an atmosphere such as air so as to inhibit polymerization, only photoalignment can be carried out, after which photopolymerization can be initiated by changing to an atmosphere such as nitrogen that does not inhibit polymerization. In this case, it is preferable not to consume all of the photopolymerization initiator while photoalignment is being carried out in the polymerization-inhibiting atmosphere by adjusting the radiation dose during photoalignment.

On the other hand, in the case of polymerizing with heat, polymerization is preferably carried out at a temperature of 80 to 250° C. and more preferably 80 to 160° C. In this case, it is preferable to add a thermopolymerization initiator.

A known, commonly used photopolymerization initiator can be used for the photopolymerization initiator used in the present invention.

Examples of photopolymerization initiators able to be used with ultraviolet light at a wavelength of 320 nm or less include 1-hydroxylcyclohexyl phenyl ketone ("Irgacure 184", Ciba Specialty Chemicals Corp.), 1-[4-(2-hydroxylethoxy)-phenyl]-2-hydroxyl 2-methyl-1-propan-1-one and 2-hydroxyl 2-methyl-1-phenylpropan-1-one ("Darocure 1173", Merck & Co., Inc.).

In addition, examples of photopolymerization initiators having a photoabsorption wavelength band differing from the photoabsorption band of the azobenzene backbone include a combination of a near infrared-absorbing dye and organic boron described in Japanese Patent No. 3016606.

Other examples of photopolymerization initiators include 1-(4-isopropylphenyl)-2-hydroxyl 2-methylpropan-1-one ("Darocure 1116", Merck & Co., Inc.), 2-methyl-1-[(methylthio) phenyl]-2-morpholinopropane-1 ("Irgacure 907", Ciba Specialty Chemicals Corp.), benzyl methyl ketal ("Irgacure 651", Ciba Specialty Chemicals Corp.), mixtures of 2,4-diethylthioxanthone ("Kayacure DETX", Nippon Kayaku Co., Ltd.) and ethyl p-dimethylaminobenzoic acid ("Kayacure EPA", Nippon Kayaku Co., Ltd.), mixtures of isopropyl thioxanthone ("Cantacure ITX", Wordprekinsop Co.) and ethyl p-dimethylaminobenzoic acid, and acyl phosphion oxide ("Lucirin TPO", BASF Corp.). The amount of photopolymerization initiator used is preferably 10% by mass or less and particularly preferably 0.5 to 5% by mass based on the polymerizable liquid crystal composition.

In addition, a known, commonly used thermopolymerization initiator can be used during thermopolymerization, examples of which include organic peroxides such as methylacetoacetate peroxide, cumene hydroperoxide, benzoyl peroxide, bis(4-t-butylcyclohexyl) peroxydicarbonate, t-butylperoxybenzoate, methyl ethyl ketone peroxide, 1,1-bis(t-hexylperoxy) 3,3,5-trimethylcyclohexane, p-pentahydroperoxide, t-butylhydroperoxide, dicumylperoxide, isobutylperoxide, di(3-methyl-3-methoxybutyl) peroxydicarbonate or 1,1-bis(t-butylperoxy)cyclohexane; azonitrile compounds such as 2,2'-azobisisobutylnitrile or 2,2'-azobis (2,4-dimethylvaleronitrile); azoamidine compounds such as 2,2'-azobis(2-methyl-N-phenylpropion-amidine) dihydrochloride, azoamide compounds such as 2,2'-azobis {2-methyl-N-[1,1-bis(hydroxylmethyl)-2-hydroxylethyl]propionamide}, and alkyl compounds such as 2,2'-azobis(2,4,4-trimethylpentane). The amount of the thermopolymerization initiator used is preferably 10% by mass or less and particularly preferably 0.5 to 5% by mass based on the polymerizable liquid crystal compound.

Since the photoalignment film of the present invention is cured by adding a compound having a hydrophilic group and a (meth)acryloyloxy group, it is resistant to solvents used for the purpose of adjusting the viscosity and so forth of existing sealants, examples of which include hydrocarbon-based solvents such as solvent naphtha, decalin, toluene, xylene, p-cymene, a-pinene, p-menthane or turpentine, halogenated hydrocarbon-based solvents such as dichloropentane, alcohol-based solvents such as n-butanol, isobutanol, n-hexanol or 2-methylcyclohexanol, diol-based solvents such as ethylene glycol or propylene glycol, ether-based solvents such as 2-ethoxyethanol, 2-butoxyethanol, 2-(ethoxyethoxy)ethanol, 2-(butoxyethoxy)ethanol, diethylene glycol diethyl ether or 1,4-dioxane, ether ester-based solvents such as ethylene glycol monomethyl ether acetate or ethylene glycol monoethyl ether acetate, ester-based solvents such as ethyl ethoxypropionate or dimethyl malonate, ketone-based solvents such as methyl isobutyl ketone, mesityl oxide, phorone or cyclohexanone, as well as diethyl acetal, diacetone alcohol, dimethylformamide and dimethylsulfoxide.

(Optically Anisotropic Medium)

In order to obtain an optically anisotropic medium using the photoalignment film composition of the present invention, a polymerizable liquid crystal is coated on the aforementioned photoalignment film followed by polymerizing in the aligned state.

The polymerization procedure for the polymerizable liquid crystal composition may be carried out in the same manner as the polymerization procedure in the case of fabricating the photoalignment film. Polymerization by heating is preferably carried out at a temperature equal to or lower than the temperature at which the polymerizable liquid crystal composition exhibits a liquid crystal phase, and in case of using a thermopolymerization initiator that releases a radical as a result of heating, it is particularly preferable to use a thermopolymerization initiator for which the cleavage temperature thereof is within the aforementioned temperature range. In addition, in the case of combining the use of the thermopolymerization initiator with a photopolymerization initiator, the polymerization temperature and each initiator are preferably selected so as to limit the aforementioned temperature range as well as so that there is no large difference in the degrees of acceleration between the photoalignment film and the polymerizable liquid crystal film. Although varying according to the transition temperature of the polymerizable liquid crystal composition from the liquid crystal phase to the isotropic phase, the heating temperature is preferably equal to or lower than the temperature at which non-uniform polymerization is induced by heating, and is preferably 20 to 300° C., more preferably 30 to 200° C. and particularly preferably 30 to 120° C. In addition, in the case the polymerizable group is a (meth)acryloyloxy group, for example, thermopolymerization is preferably carried out at a temperature below 90° C.

Specific examples of methods are described in Methods 1 to 4 below.

(Method 1)

This method for preparing an optically anisotropic medium consists of sequentially carrying out a step 1, in which a film of the aforementioned photoalignment film composition is fabricated on a substrate, a step 2 in which a polymerizable liquid crystal composition film is fabricated on the film of the photoalignment film composition, and a step 3, in which a compound having a hydrophilic group and a (meth)acryloyloxy group and the polymerizable liquid crystal composition are polymerized while aligning a compound represented by general formula (1) and the liquid crystal molecules.

In this process, since a compound having a hydrophilic group and a (meth)acryloyloxy group and a polymerizable liquid crystal present in a photoalignment film are polymerized, a bonding relationship can be introduced between the photoalignment film layer and the liquid crystal polymer layer, thereby allowing the obtaining of an optically anisotropic medium having superior interfacial adhesiveness and durability in particular. In addition, the photoisomerization reaction and polymerization can be carried out simultaneously by irradiating once with anisotropic light, thereby making the process efficient.

(Method 2)

This method for preparing an optically anisotropic medium consists of sequentially carrying out a step 1, in which a film of the photoalignment film composition is fabricated on a substrate, a step 2, in which a compound represented by general formula (1) is aligned by irradiating the film of the photoalignment film composition with anisotropic light, a step 3, in which a polymerizable liquid crystal composition film is fabricated on the film of the photoalignment film composition, and a step 4, in which a compound having a hydrophilic group and a (meth)acryloyloxy group and the polymerizable liquid crystal composition are polymerized by heat or light.

In this process, since the film of the photoalignment film composition is irradiated directly with light, a photoalignment film having a higher degree of liquid crystal alignment ability can be obtained, and since a compound having a hydrophilic group and a (meth)acryloyloxy group and a polymerizable liquid crystal coexisting in a photoalignment film are polymerized, a bonding relationship can be introduced between the photoalignment film layer and the liquid crystal polymer layer, thereby allowing the obtaining of an optically anisotropic medium having superior interfacial adhesiveness and durability in particular.

(Method 3)

This method for preparing an optically anisotropic medium consists of sequentially carrying out a step 1, in which a film of the photoalignment film composition is fabricated on a substrate, a step 2, in which a compound represented by general formula (1) is aligned by irradiating the film of the photoalignment film composition with anisotropic light, a step 3, in which a compound having a hydrophilic group and a (meth)acryloyloxy group is polymerized by heat or light, a step 4, in which a polymerizable liquid crystal composition is fabricated on the film of the photoalignment film composition, and a step 5, in which the polymerizable liquid crystal composition is polymerized by heat or light.

In this process, since a hydrophilic (meth)acrylate is polymerized prior to forming the polymerizable liquid crystal composition layer, a photoalignment film having superior mechanical or chemical strength can be obtained, and it is preferable in the case of containing a process in which a substrate on which the photoalignment film is formed is laminated or wound. In addition, since the photoalignment step and the photopolymerization step can be carried out separately, it is easy to control anchoring force.

(Method 4)

This method for preparing an optically anisotropic medium consists of sequentially carrying out a step 1, in which a film of the photoalignment film composition is fabricated on a substrate, a step 2, in which a compound having a hydrophilic group and a (meth)acryloyloxy group is polymerized while aligning a compound represented by general formula (1) by irradiating the film of the photoalignment film composition with anisotropic light, a step 3, in which a polymerizable liquid crystal composition is coated and aligned on the film of the photoalignment film composition, and a step 4, in which the polymerizable liquid crystal composition is polymerized by heat or light.

In this process, since a hydrophilic (meth)acrylate is polymerized prior to forming the polymerizable liquid crystal composition layer, a photoalignment film having superior mechanical or chemical strength can be obtained, and it is preferable in the case of containing a process in which the substrate on which the photoalignment film is formed is laminated or wound. In addition, the photoisomerization reaction and polymerization can be carried out simultaneously by irradiating once with anisotropic light, thereby making this process efficient.

The optically anisotropic medium can also be laminated over a plurality of layers depending on the case. In this case, the steps described above may be repeated a plurality of times to form a laminate of the optically anisotropic medium.

These methods may be suitably selected corresponding to the optically anisotropic medium production process. In a process such that the photoalignment film does not contact another substrate or object such as an apparatus prior to a step in which the polymerizable liquid crystal is coated, Method 1 or Method 2 are preferable since the polymerization procedure can be completed all at once, while Method 2 is more preferable since an optically anisotropic medium having superior alignment can be easily obtained. On the other hand, in the case there is the possibility of the photoalignment film contacting another substrate or object such as an apparatus as a result of deposition or winding of the substrate prior to a step in which the polymerizable liquid crystal is coated, Method 3 or Method 4 is preferably selected to immobilize the structure of the photoalignment film.

In the case of simultaneously polymerizing a compound having a hydrophilic group and a (meth)acryloyloxy group and a polymerizable liquid crystal layer as in the Method 1 or Method 2, the compound having a hydrophilic group and (meth)acryloyloxy group can be adequately cured by only adding a polymerization initiator to the polymerizable liquid crystal composition layer without adding a polymerization initiator to the photoalignment film composition. A method that uses irradiation with light for the polymerization procedure and a photopolymerization initiator for the polymerization initiator is particularly preferable due to the simplicity of the procedure. A photopolymerization initiator or thermopolymerization initiator can be used for the polymerization initiator as previously described.

In the case of obtaining an optically anisotropic medium using the method of Method 1 or Method 2, although there is the risk of the occurrence of mixing at the interface with the polymerizable liquid crystal layer if the compound having a hydrophilic group and a (meth)acryloyloxy group is a liquid, since the compound represented by general formula (1) and the compound having a hydrophilic group and a (meth)acryloyloxy group are both poorly miscible with polymerizable liquid crystal, there is little risk of this problem occurring, and this is one characteristic thereof. Moreover, since crosslinking occurs at the interface between the compound having a hydrophilic group and (meth)acryloyloxy group and the polymerizable liquid crystal composition in the case of the method of Method 1 or Method 2, there is no interfacial separation between the photoalignment film composition layer and the polymerizable liquid crystal composition layer, and an optically anisotropic medium can be obtained that is mechanically strong and has superior chemical stability with respect to chemical resistance, solvent resistance and the like.

(Polymerizable Liquid Crystal Composition)

The polymerizable liquid crystal composition used in the present invention is a liquid crystal composition that exhibits liquid crystal properties either alone or in a composition with another liquid crystal compound, and contains a compound having a polymerizable group. Examples of such compounds include linear polymerizable liquid crystal compounds having a rigid site, referred to as a mesogen in which a plurality of structures such as a 1,4-phenylene group or 1,4-cyclohexylene group are connected, and a polymerizable functional group such as a (meth)acryloyloxy group, vinyloxy group or epoxy group, as described in the Handbook of Liquid Crystals (D. Demus, J. W. Goodby, G. W. Gray, H. W. Spiess, V. Vill eds., Wiley-VCH publishers, 1998), Kikan Kagaku Sosetsu No. 22—Liquid Crystal Chemistry (Chemical Society of Japan, ed., 1994), or Japanese Unexamined Patent Publication No. H7-294735, H8-3111, H8-29618, H11-80090, H11-148079, 2000-178233, 2002-308831 and 2002-145830; linear polymerizable liquid crystal compounds having a maleimide group as described in Japanese Unexamined Patent Publication No. 2004-2373 and 2004-99446; linear polymerizable liquid crystal compounds having an allyl ether group as described in Japanese Unexamined Patent Publication No. 2004-149522; and discotic polymerizable compounds as described in the Handbook of Liquid Crystals, (D. Demus, J. W. Goodby, G. W. Gray, H. W. Spiess, V. Vill eds., Wiley-VCH publishers, 1998), Kikan Kagaku Sosetsu No. 22—Liquid Crystal Chemistry (Chemical Society of Japan, ed., 1994) or Japanese Unexamined Patent Publication No. H7-146409. Among these, the linear liquid crystal compounds having a polymerizable group are preferable since a film having a low liquid crystal temperature which is in the vicinity of room temperature is easily fabricated.

(Solvent)

There are no particular limitations on the solvent used in the polymerizable liquid crystal composition, and solvents for which the compound exhibits satisfactory solubility can be used, examples of which include aromatic hydrocarbon-based solvents such as toluene, xylene or mesitylene, ether-based solvents such as methyl acetate, ethyl acetate or propyl acetate, ketone-based solvents such as methyl ethyl ketone, methyl isopropyl ketone or cyclohexanone, ether-based solvents such as tetrahydrofuran, 1,2-dimethoxyethane or anisole, amide-based solvents such as N,N-dimethylformamide or N-methyl-2-pyrrolidone, γ-butyrolactone, and chlorobenzene. These can be used alone or two or more types can be used as a mixture. In addition, an additive can also be added.

A liquid crystal compound that does not have a polymerizable group may also be added as necessary to the polymerizable liquid crystal composition of the present invention. However, since excessive addition thereof has the risk of contamination of laminated members due to elution of liquid crystal compound from the resulting optically anisotropic medium while also having the risk of lowering the heat resistance of the optically anisotropic medium, in the case of adding such a compound, the added amount is preferably 30% by mass or less, more preferably 15% by mass or less and particularly preferably 5% by mass or less based on the total amount of the polymerizable liquid crystal composition.

A compound that has a polymerizable group but is not a polymerizable liquid crystal compound can also be added to the polymerizable liquid crystal composition used in the present invention. Such compounds can be used without any particular limitations provided they are recognized to be polymerizable monomers or polymerizable oligomers ordinarily used in this technical field. In the case of adding such a compound, the amount added is preferably 5% by mass or less and more preferably 3% by mass or less based on the polymerizable liquid crystal composition of the present invention.

A compound having optical activity, namely a chiral compound, may also be added to the polymerizable liquid crystal composition used in the present invention. The chiral compound itself is not required to exhibit a liquid crystal phase, and may or may not have a polymerizable group. In addition, the orientation of the helical structure of the chiral compound can be suitably selected according to the application of the polymer.

Specific examples of such a compound include cholesterol pelargonate or cholesterol stearate having a cholesteryl group for the chiral group, "CB-15" or "C-15" available from BDH Chemicals Pty. Ltd., "S-1082" available from Merck & Co., Ltd., and "CM-19", "CM-20" or "CM" available from Chisso Corp. having a 2-methylbutyl group for the chiral group, and "S-811" available from Merck & Co., Ltd. and "CM-21" or "CM-22" available from Chisso Corp. having a 1-methylbutyl group for the chiral group.

Although varying according to the application of the polymer of the polymerizable liquid crystal composition of the present invention, the amount of the chiral compound added is preferably such that the value (d/P) resulting from dividing the thickness (d) of the resulting polymer by the helical pitch (P) within the polymer is within the range of 0.1 to 100 and preferably within the range of 0.1 to 20.

A stabilizer for improving storage stability can also be added to the polymerizable liquid crystal composition used in the present invention. Examples of such stabilizers include hydroquinone, hydroquinone monoalkyl ethers, tertiary butyl catechols, pyrogallols, thiophenols, nitro compounds, β-naphthylamines and β-naphthols. In the case of adding such a stabilizer, the amount added is preferably 1% by mass or less and particularly preferably 0.5% by mass or less based on the polymerizable liquid crystal composition of the present invention.

In the case of using an optically anisotropic medium of the present invention in an application such as a raw material of a polarizing film or alignment film, a printing ink or paint or a protective film, a metal oxide and for forth such as metal, metal complex, dye, pigment, fluorescent material, phosphorescent material, surfactant, leveling agent, thixo agent, gelling agent, polysaccharide, ultraviolet absorber, infrared absorber, antioxidant, ion exchange resin or titanium dioxide may also be added to the polymerizable liquid crystal composition used in the present invention corresponding to the purpose of use.

The optically anisotropic medium can also be subjected to thermal aging treatment in order to stabilize solvent resistance and heat resistance of the resulting optically anisotropic medium. In this case, the optically anisotropic medium is preferably heated at a temperature equal to or higher than the glass transition temperature of the polymerizable liquid crystal film. Normally, this temperature is preferably 50 to 300° C., more preferably 80 to 240° C. and particularly preferably 100 to 220° C.

An optically anisotropic medium of the present invention can be used as a separate optically anisotropic medium after separating from the substrate, or it can be used as directly without separating from the substrate. Since the optically anisotropic medium is resistant to causing contamination of other members, it is particularly useful as a laminated layer substrate or used by laminating with other substrates. The optically anisotropic medium can also be laminated over a plurality of layers depending on the case. In this case, the aforementioned steps can be repeated a plurality of times to form a laminate of the optically anisotropic medium.

EXAMPLES

Although the following provides a more detailed explanation of the present invention through examples thereof, the present invention is not limited by these examples. Furthermore, unless specifically stated otherwise, the terms "parts" and "%" are based on mass.

Preparation of Photoalignment Film Composition (1)

After dissolving 1 part of a compound represented by general formula (1) in the form of a compound represented by formula (a) in 49 parts of N-methyl-2-pyrrolidone (NMP), 1 part of a compound "HOA-MPL" having hydrophilic and (meth)acryloyloxy groups as represented by formula (b) and 49 parts of 2-butoxyethanol (BC) were added to prepare a solution. The resulting solution was filtered with a 0.45 μm membrane filter to obtain a Photoalignment Film Composition (1).

[Chemical Formula 27]

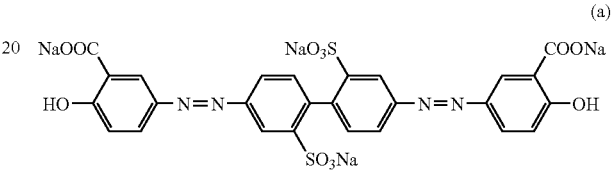

(a)

[Chemical Formula 28]

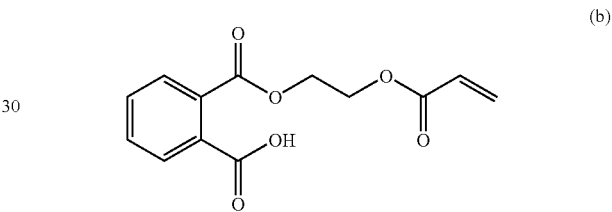

(b)

Preparation of Photoalignment Film Compositions (2)-(16)

Photoalignment Film Compositions (2) to (16) were prepared in the same manner as the Photoalignment Film Composition (1) with the exception of changing the types and incorporated amounts (parts) of the compound represented by general formula (1) and the compound having hydrophilic and (meth)acryloyloxy groups. Furthermore, Photoalignment Film Compositions (13) and (14) do not contain a compound having hydrophilic and (meth)acryloyloxy groups, while Photoalignment Film Composition (15) is composed of a compound represented by general formula (1) and an acrylate not having hydrophilic groups. The compositions thereof are as shown in Table 1.

TABLE 1

| Photoalignment Film composition | Compound represented by general formula (1) or other comparative compound | Incorporated amount (parts) | Compound having hydrophilic and (meth)acryloyloxy groups | Incorporated amount (parts) |
|---|---|---|---|---|
| (1) | Compound (a) | 1 | HOA-MPL (Compound (b)) | 1 |
| (2) | Compound (a) | 1 | HOA-HH (Compound (c)) | 1 |
| (3) | Compound (a) | 1 | DA-212 (Compound (d)) | 2 |
| (4) | Compound (a) | 1 | DA-212 (Compound (d)) | 8 |
| (5) | Compound (a) | 1 | HOA-MPL (Compound (b)) | 0.5 |
| | | | 3,4-di(3-acryloyloxypropoxy) benzoic acid (Compound (h)) | 0.5 |
| (6) | Compound (a) | 1 | UE-8200 (Compound (i)) | 0.5 |
| (7) | Compound (a) | 1 | DA-212 (Compound (d)) | 1 |
| | | | UE-8200 (Compound (i)) | 1 |
| (8) | Compound (a) | 0.5 | DA-212 (Compound (d)) | 1 |

TABLE 1-continued

| Photoalignment Film composition | Compound represented by general formula (1) or other comparative compound | Incorporated amount (parts) | Compound having hydrophilic and (meth)acryloyloxy groups | Incorporated amount (parts) |
|---|---|---|---|---|
| (9) | Compound (a) | 0.5 | DA-111 (Compound (e)) | 1 |
| (10) | Compound (a) | 0.5 | DA-911M (Compound (f)) | 1 |
| (11) | Compound (a) | 0.5 | DA-931 (Compound (g)) | 1 |
| (12) | Compound (a) | 0.25 | DA-212 (Compound (d)) | 0.5 |
| (13) | Compound (a) | 1 | | |
| (14) | Compound (k) | 1 | | |
| (15) | Compound (a) | 1 | Lauryl acrylate | 1 |
| (16) | Compound (k) | 1 | HOA-MPL (Compound (b)) | 1 |

A 1:1 mixture of N-methyl-2-pyrrolidone (NMP) and 2-butoxyethanol (BC) was used for the solvent.

The acrylates used in Photoalignment Film Compositions (1) to (12) and (16) are all acrylates having hydrophilic groups (Light Acrylate HOA-MPL (b) manufactured by Kyoeisha Chemical Co., Ltd.; Light Acrylate HOA-HH (c) manufactured by Kyoeisha Chemical Co., Ltd.; Deconal Acrylate DA-212 (d) manufactured by Nagase Chemtex Corp.; Deconal Acrylate DA-111 (e) manufactured by Nagase Chemtex Corp.; Deconal Acrylate DA-911M (f) manufactured by Nagase Chemtex Corp.; Deconal Acrylate DA-931 (g) manufactured by Nagase Chemtex Corp.; 3,4-di (3-acryloyloxypropoxy)benzoic acid (h); and Diclite UE-8200 (i) manufactured by Dainippon Ink & Chemicals, Inc.).

Photoalignment Film Compositions (5) and (7) contain two types of acrylates having hydrophilic groups. In addition, Photoalignment Film Compositions (13) to (15) are comparative compositions, while Photoalignment Film Composition (16) is a reference composition.

The structures of compounds (c) to (k) are as shown below.

[Chemical Formula 29]

(c)

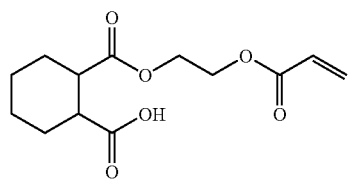

[Chemical Formula 30]

(d)

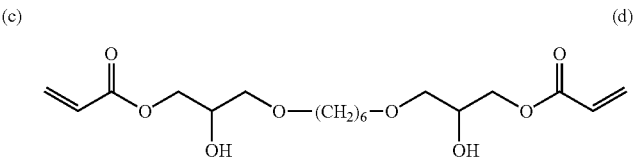

[Chemical Formula 31]

(e)

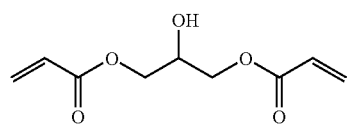

[Chemical Formula 32]

(f)

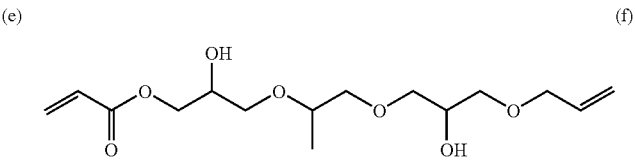

[Chemical Formula 33]

(g)

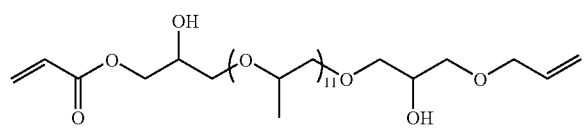

[Chemical Formula 34]

(h)

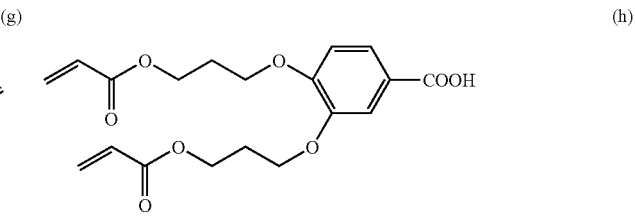

[Chemical Formula 35]

(i)

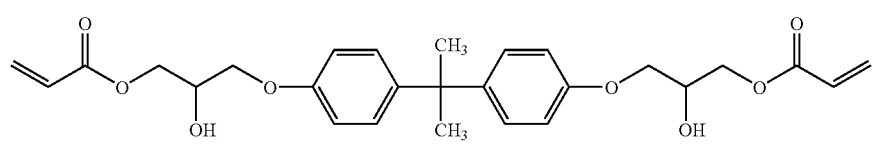

[Chemical Formula 36]

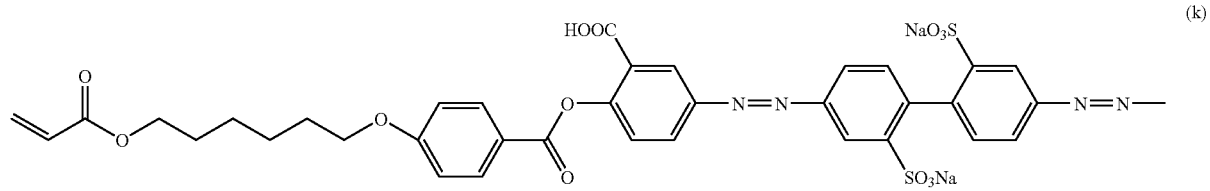

(k)

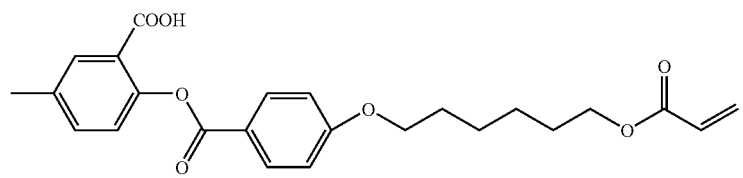

25

Preparation of Polymerizable Liquid Crystal Composition (LC-1)

After dissolving 15 parts of the compound represented by formula (m) and 15 parts of the compound represented by formula (n) in 70 parts of xylene, 1.2 parts of Irgacure 907 (Chiba Specialty Chemicals Corp.) and 0.3 parts of the acrylic copolymer represented by formula (p) were added to obtain a solution. The resulting solution was filtered with a 0.45 μm membrane filter to obtain Polymerizable Liquid Crystal Composition (LC-1).

[Chemical Formula 37]

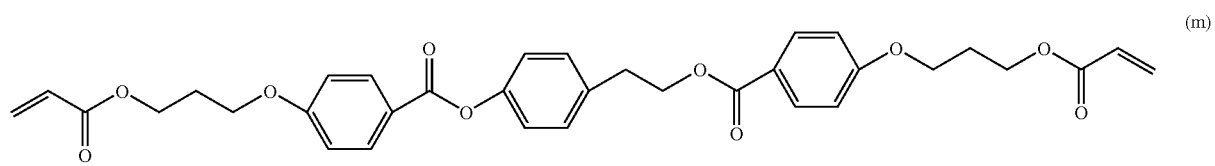

(m)

[Chemical Formula 38]

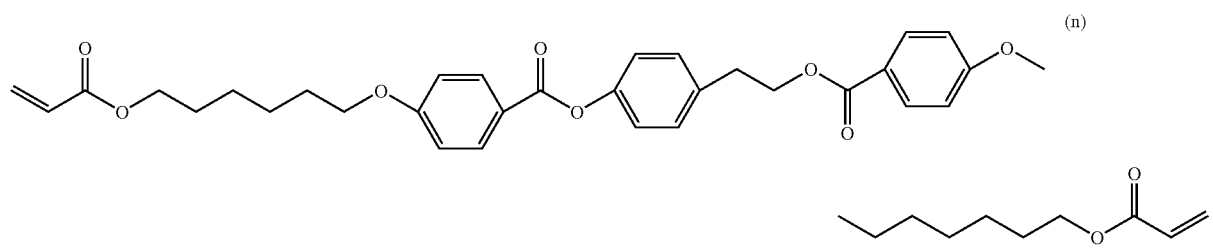

(n)

[Chemical Formula 39]

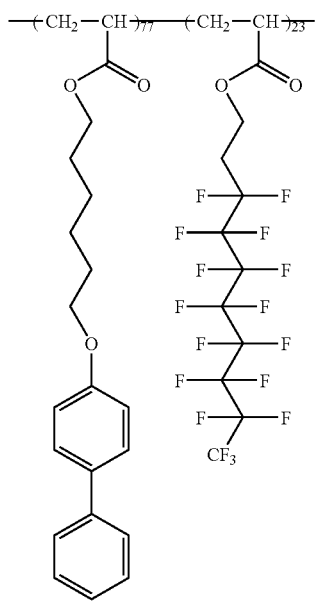

(p)

(Photoalignment Ability Evaluation Methods)

Optically anisotropic medium alignment ability was evaluated to one of five levels by visual observation and observation with a polarizing microscope.

A: Visually uniform alignment and no defects when observed with polarizing microscope B: Visually uniform alignment and alignment area of 90 to 100% when observed with polarizing microscope C: Alignment not to extent of A or B and alignment area of 60 to 90% observed with polarizing microscope D: Visually nearly unaligned and alignment area of 40 to 60% when observed with polarizing microscope E: No visual alignment and alignment area of 40% or less when observed with polarizing microscope The solvent resistance and chemical resistance of the optically anisotropic medium were evaluated to one of five levels by visual observation and observing with a polarizing microscope based on the results of coating the resulting optically anisotropic medium with a test solvent including NMP/2-butoxyethanol (BC) using a spin coater, drying for 1 minute at 80° C. and observing the condition of the film.

Furthermore, the test solvent used here consisted of a combination of solvents commonly used for the purpose of diluting photoalignment film compositions.

A: No visual change in the film and no defects when observed with polarizing microscope B: No visual change in film but cracks observed with polarizing microscope C: Some film separation visually and same levels of cracks observed as level B D: Majority of film separation visually observed E: Complete film separation visually observed (Evaluation of Optically Anisotropic Mediums)

Example 1

The Photoalignment Film Composition (1) was coated onto a glass substrate with a spin coater and dried for 1 minute at 100° C. The dried film thickness at this time was 20 nm.

Next, the resulting film was aligned by irradiating linearly polarized, parallel visible ultraviolet light (radiation intensity: 10 mW/cm$^2$), which is in the vicinity of the wavelength of 365 nm. The light was obtained by filtering light from an ultra-high-pressure mercury lamp through a wavelength cut-off filter, bandpass filter and polarizing filter, and irradiated in the direction perpendicular to the glass substrate. The radiation dose was 500 mJ/cm$^2$.

After coating the Polymerizable Liquid Crystal Composition (LC-1) onto the resulting photoalignment film with a spin coater and drying for 1 minute at 80° C., (LC-1) as well as (LC-1) and compound (b) were polymerized by irradiating with ultraviolet light at 1 J/cm$^2$ in a nitrogen atmosphere to obtain an optically anisotropic medium. As a result, satisfactory alignment having an alignment ability evaluated as level A was able to be obtained at a low radiation dose of 500 mJ/cm$^2$. The solvent resistance and chemical resistance of the optically anisotropic medium were evaluated as level A.

Example 2

An optically anisotropic medium was prepared in the same manner as Example 1 with the exception of using Photoalignment Film Composition (2) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A.

Example 3

An optically anisotropic medium was prepared in the same manner as Example 1 with the exception of using Photoalignment Film Composition (3) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 4

An optically anisotropic medium was prepared in the same manner as Example 1 with the exception of using Photoalignment Film Composition (4) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 5

An optically anisotropic medium was prepared in the same manner as Example 1 with the exception of using Photoalignment Film Composition (5) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 6

An optically anisotropic medium was prepared in the same manner as Example 1 with the exception of using Photoalignment Film Composition (6) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level B.

Example 7

An optically anisotropic medium was prepared in the same manner as Example 1 with the exception of using Photoalignment Film Composition (7) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 8

An optically anisotropic medium was prepared in the same manner as Example 1 with the exception of using Photoalignment Film Composition (8) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 9

An optically anisotropic medium was prepared in the same manner as Example 1 with the exception of using Photoalignment Film Composition (9) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 10

An optically anisotropic medium was prepared in the same manner as Example 1 with the exception of using Photoalignment Film Composition (10) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Example 11

An optically anisotropic medium was prepared in the same manner as Example 1 with the exception of using Photoalignment Film Composition (11) instead of Photoalignment Film Composition (1). As a result, satisfactory alignment having an alignment ability evaluated as level B was able to be obtained at a low radiation dose of 500 mJ/cm². The solvent resistance and chemical resistance of the optically anisotropic medium were evaluated as level A.

Example 12

An optically anisotropic medium was prepared in the same manner as Example 1 with the exception of using Photoalignment Film Composition (12) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A.

Comparative Example 1

An optically anisotropic medium was prepared in the same manner as Example 1 with the exception of using Photoalignment Film Composition (13) instead of Photoalignment Film Composition (1). As a result, although the resulting optically anisotropic medium was determined to exhibit satisfactory alignment having an alignment ability evaluated as level A at a low radiation dose of 500 mJ/cm², the solvent resistance and chemical resistance of the optically anisotropic medium was evaluated as level E, thereby demonstrating that chemical resistance and solvent resistance are inferior in the case of a composition not containing a hydrophilic acrylate.

Comparative Example 2

An optically anisotropic medium was prepared in the same manner as Example 1 with the exception of using Photoalignment Film Composition (14) instead of Photoalignment Film Composition (1). As a result, the alignment ability was evaluated as level E. It was determined that in the case of using an acrylated compound, an optically anisotropic medium having uniform and satisfactory alignment at a low radiation dose of 500 mJ/cm² is unable to be obtained.

Comparative Example 3

An optically anisotropic medium was prepared in the same manner as Example 1 with the exception of using Photoalignment Film Composition (15) instead of Photoalignment Film Composition (1). Although the Photoalignment Film Composition (15) contains a non-hydrophilic acrylate in the form of lauryl acrylate, phase separation occurred during fabrication of the photoalignment film and a non-uniform, cloudy pattern appeared. As a result, the alignment ability was evaluated as level D, and satisfactory alignment was unable to be obtained.

Reference Example 1

An optically anisotropic medium was prepared in the same manner as Example 1 with the exception of using Photoalignment Film Composition (16) instead of Photoalignment Film Composition (1). As a result, the alignment ability was evaluated as level E. It was determined that in the case of using an acrylated compound, an optically anisotropic medium having uniform and satisfactory alignment at a low radiation dose of 500 mJ/cm² is unable to be obtained. Chemical and solvent resistance of the optically anisotropic medium were evaluated as level A.

Preparation of Photoalignment Film Composition (17)

After dissolving 0.5 parts of a compound represented by general formula (1) in the form of a compound represented by formula (a) and 0.5 parts of compound (2) in the form of a compound represented by formula (q) in 49 parts of N-methyl-2-pyrrolidone (NMP), 1 part of an acrylate (DA-212) having a hydrophilic group represented by formula (d) and 49 parts of 2-butoxyethanol (BC) were added to prepare a solution. The resulting solution was filtered with a 0.45 μm filter to obtain a Photoalignment Film Composition (17).

[Chemical Formula 40]

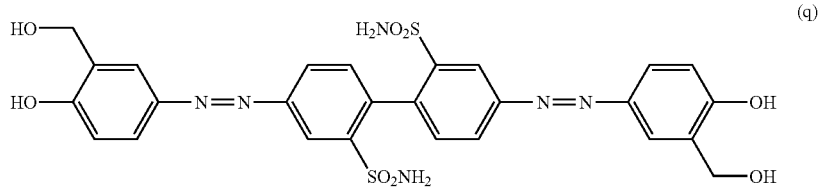

Preparation of Photoalignment Film Compositions (18)-(29)

Photoalignment film compositions (18) to (29) were obtained in the same manner as Photoalignment Film Composition (17) with the exception of changing the incorporated compounds and incorporated amounts thereof. The compositions thereof are as shown in Table 2.

TABLE 2

| Photoalignment Film Composition | Compound represented by general formula (1) | Incorporated amount (parts) | Compound having hydrophilic and (meth)acryloyloxy groups | Incorporated amount (parts) | Compound (2) | Incorporated amount (parts) |
|---|---|---|---|---|---|---|
| (17) | Compound (a) | 0.5 | DA-212 (Compound (d)) | 1 | Compound (q) | 0.5 |
| (18) | Compound (a) | 0.5 | DA-212 (Compound (d)) | 1 | Compound (q) | 1 |
| (19) | Compound (a) | 1 | DA-212 (Compound (d)) | 1 | Compound (q) | 5 |
| (20) | Compound (a) | 0.5 | DA-212 (Compound (d)) | 1 | Compound (r) | 0.5 |
| (21) | Compound (a) | 1 | DA-212 (Compound (d)) | 1 | Compound (r) | 2 |
| (22) | Compound (a) | 0.5 | DA-212 (Compound (d)) | 1 | Compound (s) | 0.5 |
| (23) | Compound (a) | 0.5 | DA-212 (Compound (d)) | 1 | Compound (t) | 0.5 |
| (24) | Compound (a) | 0.5 | DA-111 (Compound (e)) | 1 | Compound (u) | 1 |
| (25) | Compound (a) | 0.5 | DA-111 (Compound (e)) | 1 | Compound (u) | 2 |
| (26) | Compound (a) | 0.5 | DA-111 (Compound (e)) | 1 | Compound (u) | 5 |
| (27) | Compound (a) | 0.5 | DA-911M (Compound (f)) | 1 | Compound (u) | 1 |
| (28) | Compound (a) | 0.25 | DA-212 (Compound (d)) | 0.5 | Compound (u) | 0.5 |
|  |  |  | DA-111 (Compound (e)) | 0.5 |  |  |
| (29) | Compound (a) | 0.5 | DA-212 (Compound (d)) | 1 | Compound (w) | 0.2 |

A 1:1 mixture of N-methyl-2-pyrrolidone (NMP) and 2-butoxyethanol (BC) was used for the solvent in all compositions.

The acrylates used in Photoalignment Film Compositions (17) to (29) are all acrylates having hydrophilic groups (Deconal Acrylate DA-212 (d) manufactured by Nagase Chemtex Corp.; Deconal Acrylate DA-111 (e) manufactured by Nagase Chemtex Corp.; Deconal Acrylate DA-911M (f) manufactured by Nagase Chemtex Corp.).

Photoalignment Film Composition (28) contains two types of acrylates having hydrophilic groups. Photoalignment Film Compositions (17) to (23) contain compounds represented by general formula (2-1) ((q), (r), (s), (t)). Photoalignment Film Compositions (24) to (28) contain compound (u) represented by general formula (2-2). Photoalignment Film Composition (29) contains a triphenylene compound (w) having hydroxyl groups.

The structures of compounds (r) to (w) are as shown below.

[Chemical Formula 41]

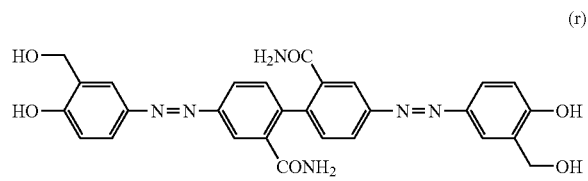

(r)

[Chemical Formula 42]

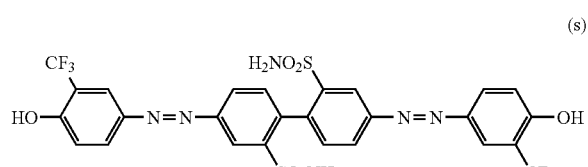

(s)

[Chemical Formula 43]

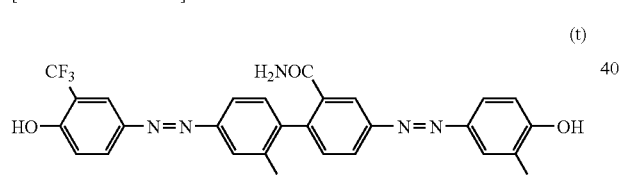

(t)

[Chemical Formula 44]

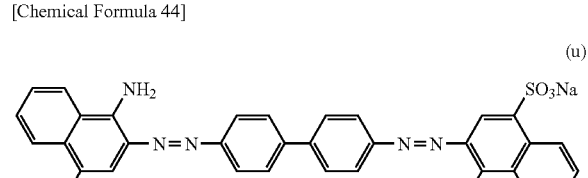

(u)

[Chemical Formula 45]

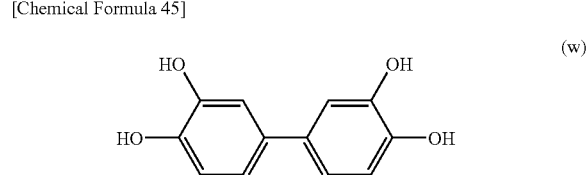

(w)

(Heat Resistance Evaluation Method)

Heat resistance was evaluated by measuring retardation of the optically anisotropic mediums before and after heating for 4 hours at 230° C. (DI4RD: Chuo Precision Industrial Co., Ltd.) and comparing the two values. Retardation before heating was defined as Re1 (mm), retardation after heating was defined as Re2 (mm), and percent Re % (%) (Re %=Re2/Re1×100), defined as the ratio of retardation after heating to retardation before heating, was used as an indicator of heat resistance. Since the change in retardation is smaller the better the heat resistance, the larger the value of Re % the better the heat resistance.

(Evaluation as Optically Anisotropic Medium)

Example 13

An optically anisotropic medium was prepared in the same manner as Example 1 with the exception of using Photoalignment Film Composition (17) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A. In addition, the results of heat resistance at that time yielded superior heat resistance of Re %=68%.

Example 14

An optically anisotropic medium was prepared in the same manner as Example 1 with the exception of using Photoalignment Film Composition (18) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A. In addition, the results of heat resistance at that time yielded superior heat resistance of Re %=71%.

Example 15

An optically anisotropic medium was prepared in the same manner as Example 1 with the exception of using Photoalignment Film Composition (19) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A. In addition, the results of heat resistance at that time yielded superior heat resistance of Re %=74%.

Example 16

An optically anisotropic medium was prepared in the same manner as Example 1 with the exception of using Photoalignment Film Composition (20) instead of Photoalignment Film Composition (1). As a result, satisfactory alignment having an alignment ability evaluated as level A was able to be obtained at a low radiation dose of 500 mJ/cm². The solvent resistance and chemical resistance of the optically anisotropic medium were evaluated as level A. In addition, the results of heat resistance at that time yielded superior heat resistance of Re %=67%.

Example 17

An optically anisotropic medium was prepared in the same manner as Example 1 with the exception of using Photoalignment Film Composition (21) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=73%.

Example 18

An optically anisotropic medium was prepared in the same manner as Example 1 with the exception of using Photoalignment Film Composition (22) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=68%.

Example 19

An optically anisotropic medium was prepared in the same manner as Example 1 with the exception of using Photoalignment Film Composition (23) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=69%.

Example 20

An optically anisotropic medium was prepared in the same manner as Example 1 with the exception of using Photoalignment Film Composition (24) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=67%.

Example 21

An optically anisotropic medium was prepared in the same manner as Example 1 with the exception of using Photoalignment Film Composition (25) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=69%.

Example 22

An optically anisotropic medium was prepared in the same manner as Example 1 with the exception of using Photoalignment Film Composition (26) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=76%.

Example 23

An optically anisotropic medium was prepared in the same manner as Example 1 with the exception of using Photoalignment Film Composition (27) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=70%.

Example 24

An optically anisotropic medium was prepared in the same manner as Example 1 with the exception of using Photoalignment Film Composition (28) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=67%.

Example 25

An optically anisotropic medium was prepared in the same manner as Example 1 with the exception of using Photoalignment Film Composition (29) instead of Photoalignment Film Composition (1). As a result, satisfactory alignment having an alignment ability evaluated as level A was able to be obtained at a low radiation dose of 500 mJ/cm$^2$. The solvent resistance and chemical resistance of the optically anisotropic medium were evaluated as level A. In addition, the results of heat resistance at that time yielded superior heat resistance of Re %=70%.

Comparative Example 4

As a result of evaluating heat resistance of the optically anisotropic medium obtained in Comparative Example 1, the heat resistance thereof was found to be low at Re %=59%.

INDUSTRIAL APPLICABILITY

The use of the photoalignment film composition of the present invention makes it possible to provide a highly sensitive photoalignment film. This photoalignment film is not damaged by adhesive members used in the cell manufacturing process, or organic solvents used in adhesive members, polymerizable liquid crystal composition solutions or alignment film solutions and the like. Moreover, the present invention is able to provide an optically anisotropic medium that uses the photoalignment film. This optically anisotropic medium is not damaged by organic solvents and the like.

The invention claimed is:
1. A photoalignment film composition comprising:
a compound represented by general formula (1):

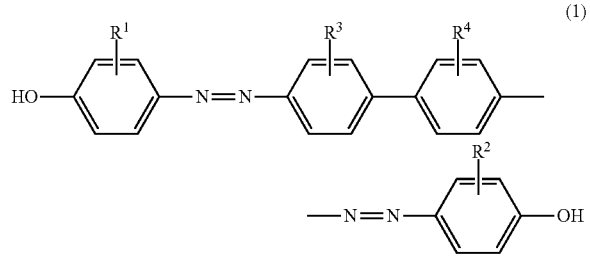

(1)

(wherein, $R^1$ and $R^2$ respectively and independently represent a hydrogen atom, halogen atom, carboxyl group or alkali metal salt thereof, halogenated methyl group, halogenated methoxy group, cyano group, nitro group, —$OR^5$ (provided that $R^5$ represents an alkyl group having 1 to 6 carbon atoms, a cycloalkyl group having 3 to 6 carbon atoms or an alkyl group having 1 to 6 carbon atoms substituted with an alkoxy group having 1 to 6 carbon atoms), hydroxylalkyl group having 1 to 4 carbon atoms, —$CONR^6R^7$ (provided that $R^6$ and $R^7$ respectively and independently represent a hydrogen atom or an alkyl group having 1 to 6 carbon atoms) or methoxycarbonyl group, and $R^3$ and $R^4$ respectively and independently represent a carboxyl group or alkali metal salt thereof, sulfo group or alkali metal salt thereof, nitro group, amino group, carbamoyl group, alkoxycarbonyl group, sulfamoyl group or hydroxyl group), wherein the compound represented by general formula (1) is a compound (1-1) wherein $R^3$ and $R^4$ in general formula (1) represent a sulfo group or an alkali metal salt thereof;
    at least one compound (2) selected from the group consisting of a compound represented by general formula (2-1), a compound represented by general formula (2-2) and a triphenylene (2-3) having a hydroxyl group as a substituent thereof, and the ratio of the compound (1-1) to the compound (2) is within the range of 1:0.1 to 1:10:

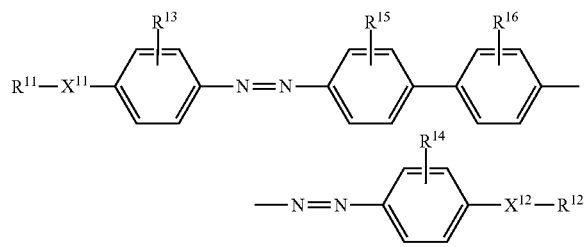

(2-1)

(wherein, $R^{11}$ and $R^{12}$ respectively and independently represent a hydroxyl group or a polymerizable functional group selected from the group consisting of a (meth)acryloyloxy group, (meth)acrylamide group, vinyl group, vinyloxy group and maleimide group, $X^{11}$ represents a single bond in the case $R^{11}$ represents a hydroxyl group or represents a linking group represented by -($A^1$-$B^1$)$_m$- in the case $R^{11}$ represents a polymerizable functional group, $X^{12}$ represents a single bond in the case $R^{12}$ represents a hydroxyl group or represents a linking group represented by -($A^2$-$B^2$)$_n$- in the case $R^{12}$ represents a polymerizable functional group, $A^1$ is bonded to $R^{11}$ while $A^2$ is bonded to $R^{12}$, $A^1$ and $A^2$ respectively and independently represent a single bond or a divalent hydrocarbon group, $B^1$ and $B^2$ respectively and independently represent a single bond, —O—, —CO—O—, —O—CO—, —CO—NH—, —NH—CO—, —NH—CO—O— or —O—CO—NH—, and m and n respectively and independently represent an integer of 1 to 4, provided that when m or n is 2 or more, the plurality of $A^1$, $B^1$, $A^2$ and $B^2$ may be the same or different, and provided that $A^1$ or $A^2$ interposed between two $B^1$ or $B^2$ is not a single bond, $R^{13}$ and $R^{14}$ respectively and independently represent a hydrogen atom, halogen atom, carboxyl group or alkali metal salt thereof, halogenated methyl group, halogenated methoxy group, cyano group, nitro group, —$OR^{17}$ (provided that $R^{17}$ represents an alkyl group having 1 to 6 carbon atoms, a cycloalkyl group having 3 to 6 carbon atoms, or an alkyl group having 1 to 6 carbon atoms substituted with an alkoxy group having 1 to 6 carbon atoms), hydroxylalkyl group having 1 to 4 carbon atoms, —$CONR^{18}R^{19}$ (provided that $R^{18}$ and $R^{19}$ respectively and independently represent a hydrogen atom or an alkyl group having 1 to 6 carbon atoms) or methoxycarbonyl group, and $R^{15}$ and $R^{16}$ respectively and independently represent a carbamoyl group or sulfamoyl group);

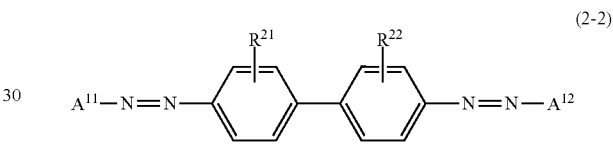

(2-2)

(wherein, $R^{21}$ and $R^{22}$ respectively and independently represent a hydrogen atom, alkyl group having 1 to 6 carbon atoms or alkoxy group having 1 to 6 carbon atoms, and $A^{11}$ and $A^{12}$ respectively and independently represent a naphthalene ring having an amino group, and a sulfo group or an alkali metal salt thereof as a substituent, or a benzene ring having an amino group, and a sulfo group or an alkali metal salt thereof as a substituent); and
    a compound having a hydrophilic group and a (meth)acryloyloxy group.
2. The photoalignment film composition according to claim 1, wherein the hydrophilic group is a hydroxyl group or a carboxyl group.
3. The photoalignment film composition according to claim 1, wherein the compound containing a hydrophilic group and a (meth)acryloyloxy group is contained at 10 to 90% by mass based on the total amount of non-volatile components in the composition.
4. An optically anisotropic medium obtained by polymerizing a polymerizable liquid crystal composition film fabricated on a liquid crystal alignment film in an aligned state, wherein the liquid crystal alignment film is obtained by aligning the photoalignment film composition according to claim 1.
5. A method for preparing an optically anisotropic medium comprising the successive steps of:
    a step 1, in which a film of the photoalignment film composition according to claim 1 is fabricated on a substrate;
    a step 2 in which a polymerizable liquid crystal composition film is fabricated on the film of the photoalignment film composition; and
    a step 3, in which a compound having a hydrophilic group and a (meth)acryloyloxy group and a polymerizable liquid crystal composition are polymerized while aligning a compound represented by general formula (1) and the liquid crystal molecules by irradiating with anisotropic light.

6. A method for preparing an optically anisotropic medium comprising the successive steps of:
- a step 1, in which a film of the photoalignment film composition according to claim 1 is fabricated on a substrate;
- a step 2, in which a compound represented by general formula (1) is aligned by irradiating the film of the photoalignment film composition with anisotropic light;
- a step 3, in which a polymerizable liquid crystal composition is fabricated on the film of the photoalignment film composition; and
- a step 4, in which a compound having a hydrophilic group and a (meth)acryloyloxy group and the polymerizable liquid crystal composition are polymerized by heat or light.

7. A method for preparing an optically anisotropic medium comprising the successive steps of:
- a step 1, in which a film of the photoalignment film composition according to claim 1 is fabricated on a substrate;
- a step 2, in which a compound represented by general formula (1) is aligned by irradiating the film of the photoalignment film composition with anisotropic light;
- a step 3, in which a compound having a hydrophilic group and a (meth)acryloyloxy group is polymerized with heat or light;
- a step 4, in which a polymerizable liquid crystal composition film is fabricated on the film of the photoalignment film composition; and
- a step 5, in which the polymerizable liquid crystal composition is polymerized with heat or light.

8. A method for preparing an optically anisotropic medium comprising the successive steps of:
- a step 1, in which a film of the photoalignment film composition according to claim 1 is fabricated on a substrate;
- a step 2, in which a compound having a hydrophilic group and (meth)acryloyloxy group is polymerized while aligning a compound represented by general formula (1) by irradiating the film of the photoalignment film composition with anisotropic light;
- a step 3, in which a polymerizable liquid crystal composition is coated on the film of the photoalignment film composition and aligned; and
- a step 4, in which the polymerizable liquid crystal composition is polymerized with heat or light.

* * * * *